US012041172B2

(12) United States Patent
Yee et al.

(10) Patent No.: US 12,041,172 B2
(45) Date of Patent: Jul. 16, 2024

(54) CRYPTOGRAPHIC AUTHENTICATION TO CONTROL ACCESS TO STORAGE DEVICES

(71) Applicant: Capital One Services, LLC, McLean, VA (US)

(72) Inventors: Bryant Yee, Washington, DC (US); Mykhaylo Bulgakov, Arlington, VA (US); George Bergeron, Falls Church, VA (US)

(73) Assignee: Capital One Services, LLC, McLean, VA (US)

( * ) Notice: Subject to any disclaimer, the term of this patent is extended or adjusted under 35 U.S.C. 154(b) by 501 days.

(21) Appl. No.: 17/358,473

(22) Filed: Jun. 25, 2021

(65) Prior Publication Data

US 2022/0417024 A1    Dec. 29, 2022

(51) Int. Cl.
*H04L 29/06*        (2006.01)
*G06F 3/06*         (2006.01)
(Continued)

(52) U.S. Cl.
CPC .......... *H04L 9/3226* (2013.01); *G06F 3/0622* (2013.01); *G06F 3/0655* (2013.01);
(Continued)

(58) Field of Classification Search
None
See application file for complete search history.

(56) References Cited

U.S. PATENT DOCUMENTS 4,683,553 A    7/1987   Mollier
4,827,113 A    5/1989   Rikuna
(Continued)

FOREIGN PATENT DOCUMENTS

CA      3010336 A1    7/2017
CN    101192295 A     6/2008
(Continued)

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.
(Continued)

*Primary Examiner* — Lisa C Lewis
(74) *Attorney, Agent, or Firm* — KDW Firm PLLC

(57) ABSTRACT

Systems, methods, apparatuses, and computer-readable media for cryptographic authentication to control access to storage devices. An applet executing on a processor of a contactless card may receive, via a wireless communications interface of the contactless card, a request to access a storage device of the contactless card, where the storage device is in a locked state. The applet may generate a cryptogram based on the request and transmit the cryptogram to a computing device via the wireless communications interface. The applet may receive, from the computing device, an indication specifying that a server decrypted the cryptogram. The applet may transmit, to a controller of the storage device and based on the indication specifying that the server decrypted the cryptogram, an indication specifying to unlock the storage device. The controller may transition the storage device from the locked state to an unlocked state based on the indication received from the applet.

20 Claims, 16 Drawing Sheets

(51) Int. Cl.
   *G06F 13/42*   (2006.01)
   *G06F 21/00*   (2013.01)
   *H04L 9/32*    (2006.01)

(52) U.S. Cl.
   CPC ........ *G06F 3/0679* (2013.01); *G06F 13/4282* (2013.01); *H04L 9/3234* (2013.01); *G06F 2213/0042* (2013.01); *H04L 2209/805* (2013.01)

(56) References Cited

U.S. PATENT DOCUMENTS

| | | |
|---|---|---|
| 4,910,773 A | 3/1990 | Hazard et al. |
| 5,036,461 A | 7/1991 | Elliott et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,592,553 A | 1/1997 | Guski et al. |
| 5,616,901 A | 4/1997 | Crandall |
| 5,666,415 A | 9/1997 | Kaufman |
| 5,763,373 A | 6/1998 | Robinson et al. |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Kaminkow |
| 8,005,426 B2 | 8/2011 | Huomo et al. |
| 8,010,405 B1 | 8/2011 | Bortolin et al. |
| RE42,762 E | 9/2011 | Shin et al. |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |

(56) References Cited

U.S. PATENT DOCUMENTS

| | | |
|---|---|---|
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Bailey et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | de Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | Von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,880,903 B2 | 11/2014 | Roberts et al. |
| 8,888,002 B2 | 11/2014 | Marshall Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,460,378 B2 | 10/2016 | Andre |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 10,453,054 B2 | 10/2019 | Zarakas et al. |
| 10,510,074 B1 | 12/2019 | Rule et al. |
| 10,552,809 B2 * | 2/2020 | Evans ............... G06Q 20/3552 |
| 10,614,219 B2 | 4/2020 | Knapp et al. |
| 10,645,079 B2 | 5/2020 | Arora et al. |
| 10,733,645 B2 * | 8/2020 | Rule .................. G06Q 20/352 |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |

(56) References Cited

U.S. PATENT DOCUMENTS

| | | |
|---|---|---|
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham II et al. |
| 2008/0209543 A1 | 8/2008 | Aaron |
| 2008/0223918 A1 | 9/2008 | Williams et al. |
| 2008/0285746 A1 | 11/2008 | Androck et al. |
| 2008/0308641 A1 | 12/2008 | Finn |
| 2009/0037275 A1 | 2/2009 | Pollio |
| 2009/0048026 A1 | 2/2009 | French |
| 2009/0063802 A1* | 3/2009 | Johnson ............. G06F 12/1466 711/E12.001 |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Zu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |

(56) References Cited

U.S. PATENT DOCUMENTS

| | | |
|---|---|---|
| 2014/0208112 A1 | 7/2014 | McDonald et al. |
| 2014/0214674 A1 | 7/2014 | Narula |
| 2014/0229375 A1 | 8/2014 | Zaytsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0302409 A1 | 10/2015 | Malek et al. |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0181958 A1 | 6/2018 | Locke et al. |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0238517 A1 | 8/2019 | D'Agostino et al. |
| 2020/0106620 A1 | 4/2020 | Newman |
| 2021/0035082 A1 | 2/2021 | Sherif et al. |

FOREIGN PATENT DOCUMENTS

| | | |
|---|---|---|
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1783919 A1 | 5/2007 |
| EP | 2139196 A1 | 12/2009 |
| EP | 1469419 A1 | 8/2012 |
| EP | 2852070 A1 | 3/2015 |
| GB | 2457221 A | 8/2009 |
| GB | 2516861 A | 2/2015 |
| GB | 2551907 A | 1/2018 |
| KR | 101508320 B1 | 4/2015 |
| WO | 0049586 A1 | 8/2000 |
| WO | 2006070189 A2 | 7/2006 |
| WO | 2008055170 A2 | 5/2008 |
| WO | 2009025605 A2 | 2/2009 |
| WO | 2010049252 A1 | 5/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |
| WO | 2014043278 A1 | 3/2014 |
| WO | 2014170741 A2 | 10/2014 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |
| WO | 2017042375 A1 | 3/2017 |
| WO | 2017042400 A1 | 3/2017 |
| WO | 2017157859 A1 | 9/2017 |
| WO | 2017208063 A1 | 12/2017 |
| WO | 2018063809 A1 | 4/2018 |
| WO | 2018137888 A1 | 8/2018 |

OTHER PUBLICATIONS

Haykin, M. and Warnar, R., "Smart Card Technology: New Methods for Computer Access Control", Computer Science and Technology NIST Special Publication 500-157:1-60 (1988).

Ehpamer, H., "Component of the RFID System", RFID Design Principles, 2nd edition pp. 133-201 (2012).

(56) References Cited

OTHER PUBLICATIONS

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.
Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.
Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.
Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.
Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.
Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.
Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.
Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.
Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.
Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.
Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., " The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K., "Goldbug Big Seven open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2019]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture 10.pdf, 8 pages.
Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.
Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019]. Retrieved from Internet URL: https://www.secureauth.com/products/access-management/adaptive-authentication, 7 pages.
Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.
Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-brw1103/mac, 3 pages.
Menghin, M.J., "Power Optimization Techniques for Near Field Communication Systems", 2014 Dissertation at Technical University of Graz [online]. Retrieved from Internet URL: https://diglib.tugraz.at/download.php?d=576a7b910d2d6&location=browse, 135 pages.
Mareli, M., et al., "Experimental evaluation of NFC reliability between an RFID tag and a smartphone", Conference paper (2013) IEEE AFRICON at Mauritius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera Slam", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.
Author Unknown: "onetappayment™", [online] Jan. 24, 2019, [retrieved on Mar. 25, 2019]. Retrieved from Internet URL: https://www.payubiz.in/onetap, 4 pages.
Vu, et al., "Distinguishing users with capacitive touch communication", Proceedings of the Annual International Conference on Mobile Computing and Networking, 2012, MOBICOM. 10.1145/2348543.2348569.
Pourghomi, P., et al., "A Proposed NFC Payment Application," International Journal of Advanced Computer Science and Applications, 4(8):173-181 (2013).
Author unknown, "EMV Card Personalization Specification", EMVCo., LLC., specification version 1.0, (2003) 81 pages.

(56) References Cited

OTHER PUBLICATIONS

Ullmann et al., "On-Card User Authentication for Contactless Smart Cards based on Gesture Recognition", paper presentation LNI proceedings, (2012) 12 pages.
Faraj, S.T., et al., "Investigation of Java Smart Card Technology for Multi-Task Applications", J of Al-Anbar University for Pure Science, 2(1):23 pages (2008).
Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.
International Search Report and Written Opinion for the International Patent Application No. PCT/US2022/034863, mailed Oct. 19, 2022, 14 pages.

\* cited by examiner

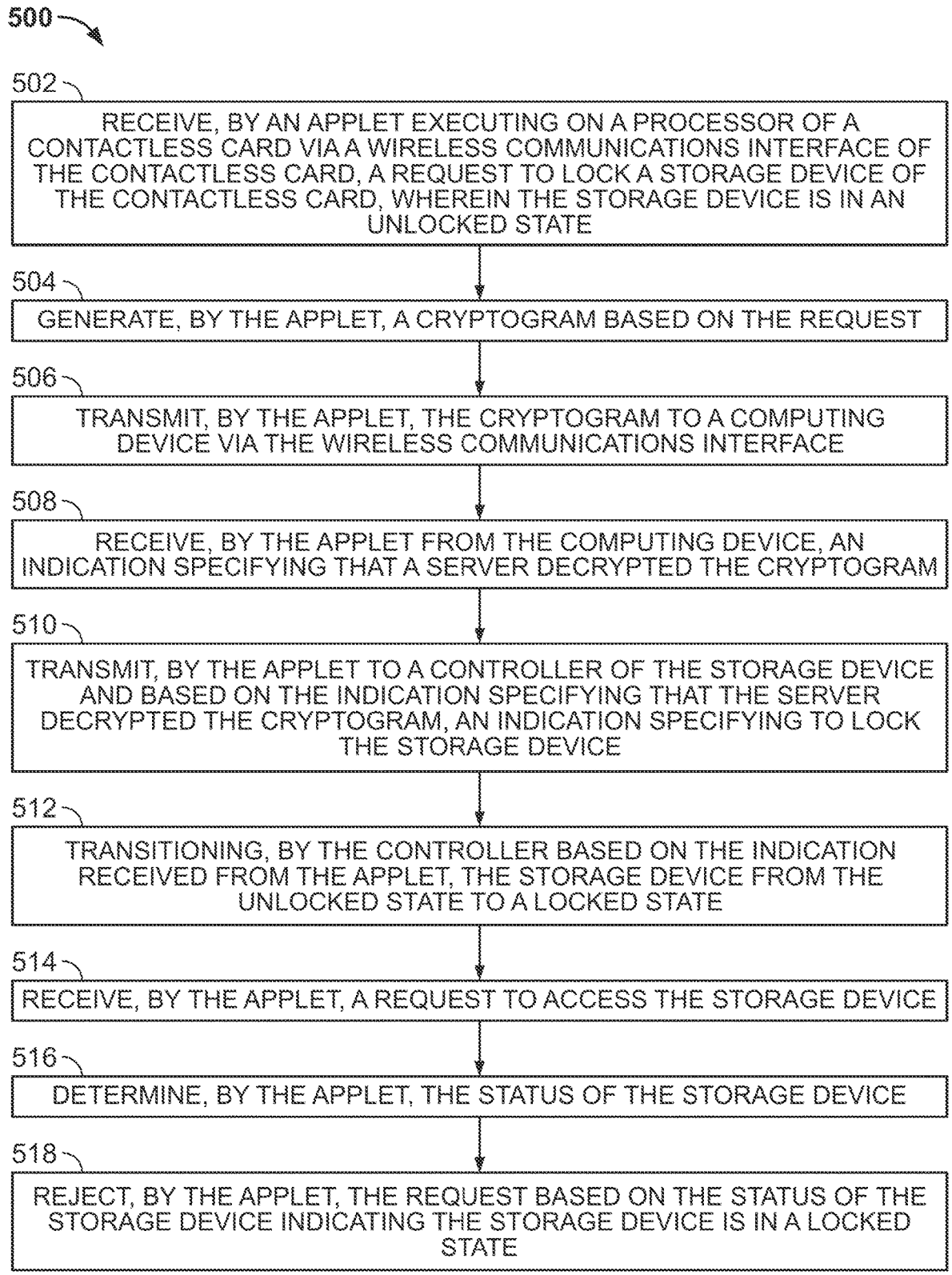

CRYPTOGRAPHIC AUTHENTICATION TO CONTROL ACCESS TO STORAGE DEVICES

BACKGROUND

Storage devices have become more compact and portable over time. However, these features may cause users to misplace or otherwise lose storage devices. Absent security measures, the data stored on the storage device may be accessible to anyone who possesses a storage device, including any malicious actors. Therefore, unsecured storage devices pose a security risk.

SUMMARY

Systems, methods, apparatuses, and computer-readable media for cryptographic authentication to control access to storage devices. In one aspect, a method includes receiving, by an applet executing on a processor of a contactless card via a wireless communications interface of the contactless card, a request to access a storage device of the contactless card, where the storage device is in a locked state, generating, by the applet, a cryptogram based on the request, transmitting, by the applet, the cryptogram to a computing device via the wireless communications interface, receiving, by the applet from the computing device, an indication specifying that a server decrypted the cryptogram, transmitting, by the applet to a controller of the storage device and based on the indication specifying that the server decrypted the cryptogram, an indication specifying to unlock the storage device, and transitioning, by the controller based on the indication received from the applet, the storage device from the locked state to an unlocked state.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 5 illustrates a routine in accordance with one embodiment.

DETAILED DESCRIPTION

Figure 1A:
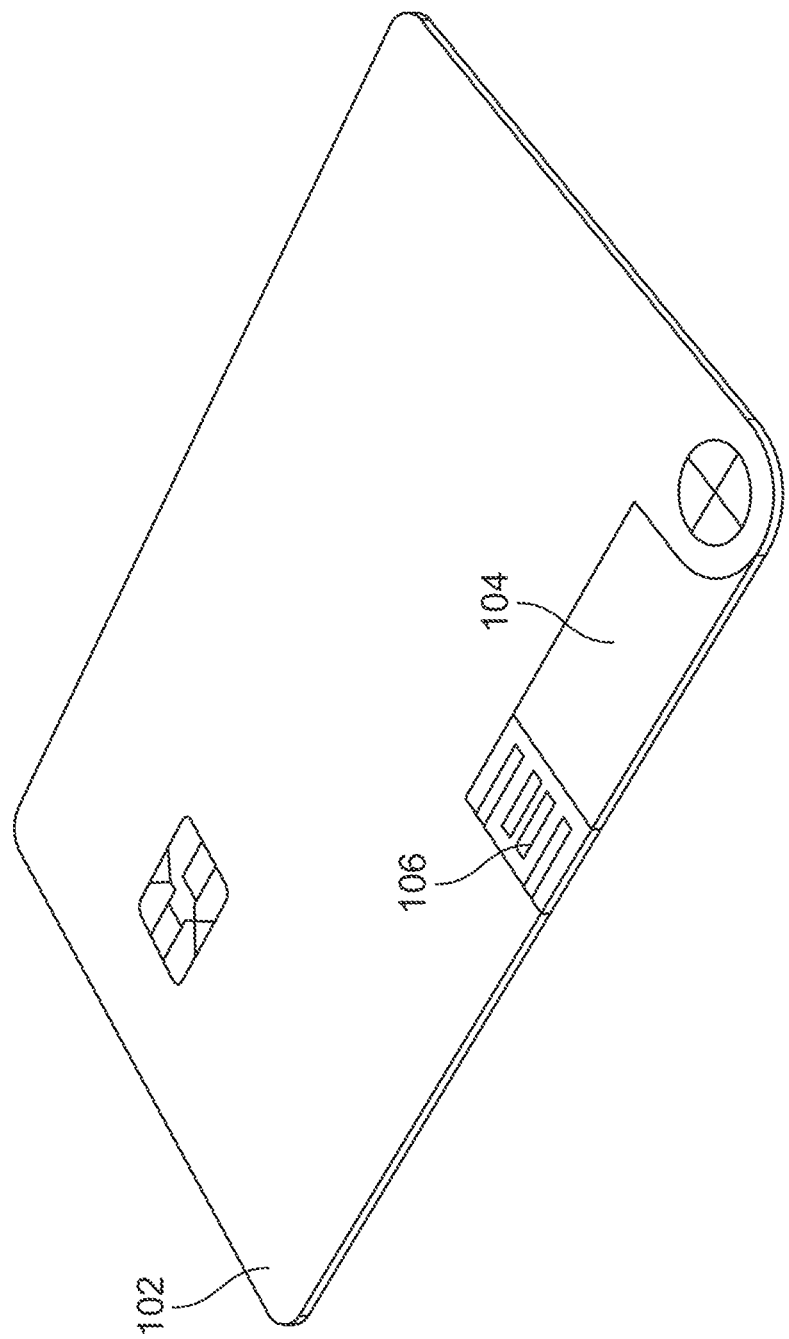
FIG. 1A illustrates an aspect of the subject matter in accordance with one embodiment.

Embodiments disclosed herein provide techniques for cryptographic authentication to control access to storage devices. In one example, a contactless card may include an integrated storage device, such as a universal serial bus (USB) storage device. A controller may generally control access to the storage device, e.g., by locking and/or unlocking the storage device. To unlock the storage device, cryptographic techniques may be used. For example, a user of a computing device may wish to read data on the storage device, write data to the storage device, and/or otherwise access the storage device using one or more applications. In response, the computing device may instruct the user to tap the contactless card to the computing device, thereby bringing the contactless card within wireless communications range with the computing device. The computing device may then wirelessly instruct an applet executing on the contactless card to generate a cryptogram. A wireless card reader of the computing device may read the cryptogram and transmit the cryptogram to an authentication server for verification. If the authentication server does not decrypt of otherwise verify the cryptogram, the server may return a corresponding indication to the computing device. The computing device may then transmit an indication to the contactless card indicating the server did not decrypt or otherwise verify the cryptogram. The controller may then maintain the storage device in a locked state and restrict any attempted access to the storage device, thereby preserving the security of the storage device and any data stored thereon.

If the authentication server is able to decrypt the cryptogram, the authentication server transmit an indication to the computing device indicating the server decrypted the cryptogram. In response, the computing device may transmit, to the applet, an indication specifying that the cryptogram was decrypted or otherwise verified. The applet may then transmit an indication and/or instruction to the controller to unlock the storage device based on the decryption of the cryptogram by the server. The controller may then unlock the storage device and permit the requested access to the storage device. For example, the storage device may be inserted into a USB port of the computing device and the controller may permit access to the storage device (e.g., to read, write, and/or otherwise modify data stored in the storage device). As another example, wireless access to the storage device may be provided, e.g., via wireless data transfer between the contactless card and the computing device. Embodiments are not limited in these contexts.

Advantageously, embodiments disclosed herein provide techniques to secure access to storage devices. By leveraging cryptograms generated by contactless cards, embodiments of the disclosure may securely verify the identity of the user with minimal risk of fraudulent activity. Furthermore, doing so ensures that read/write/modify operations are only permitted on the storage device when the user has access to a contactless card that facilitates the cryptogram verification with the server. Doing so enhances the security of the data stored on the storage device and/or improves the security of the controller.

With general reference to notations and nomenclature used herein, one or more portions of the detailed description which follows may be presented in terms of program procedures executed on a computer or network of computers. These procedural descriptions and representations are used by those skilled in the art to convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1A illustrates an example contactless card 102, according to at least one embodiment. The contactless card 102 is representative of any type of card, such as a credit card, debit card, gift card, smart card, and the like. As shown, the contactless card 102 includes a storage device 104. The storage device 104 includes a non-volatile computer-readable storage medium (not pictured) to store data. Examples of non-volatile storage media include, without limitation, dynamic random access memory (DRAM), static random access memory (SRAM), flash memory, embedded multi-media controllers (eMMC), electrically erasable programmable read-only memory (EEPROM), and the like. The storage device 104 further includes an interface 106 (also referred to as a "connector" herein). Examples of the interface 106 include, but are not limited to, a universal serial bus (USB) interface, which may be used as a reference example herein. For example, the interface 106 may include USB-A connectors, USB-B connectors, USB-C connectors, Lightning connectors, Micro-A connectors, Micro-B connectors, Mini-A connectors, Mini-B connectors, etc.). The interface 106 may be various other forms of interfaces, including external Serial AT Attachment (eSATA), Firewire, etc. In some embodiments, the storage device 104 may communicate via a memory card interface. Accordingly, storage device 104 may be compatible with a memory card family, such as MultiMediaCard (MMC), Secure Digital (SD), Memory Stick, extreme digital (XD), XQD, CompactFlash (CF), etc. The use of USB as a reference example herein is not limiting of the disclosure.

Figure 1B:
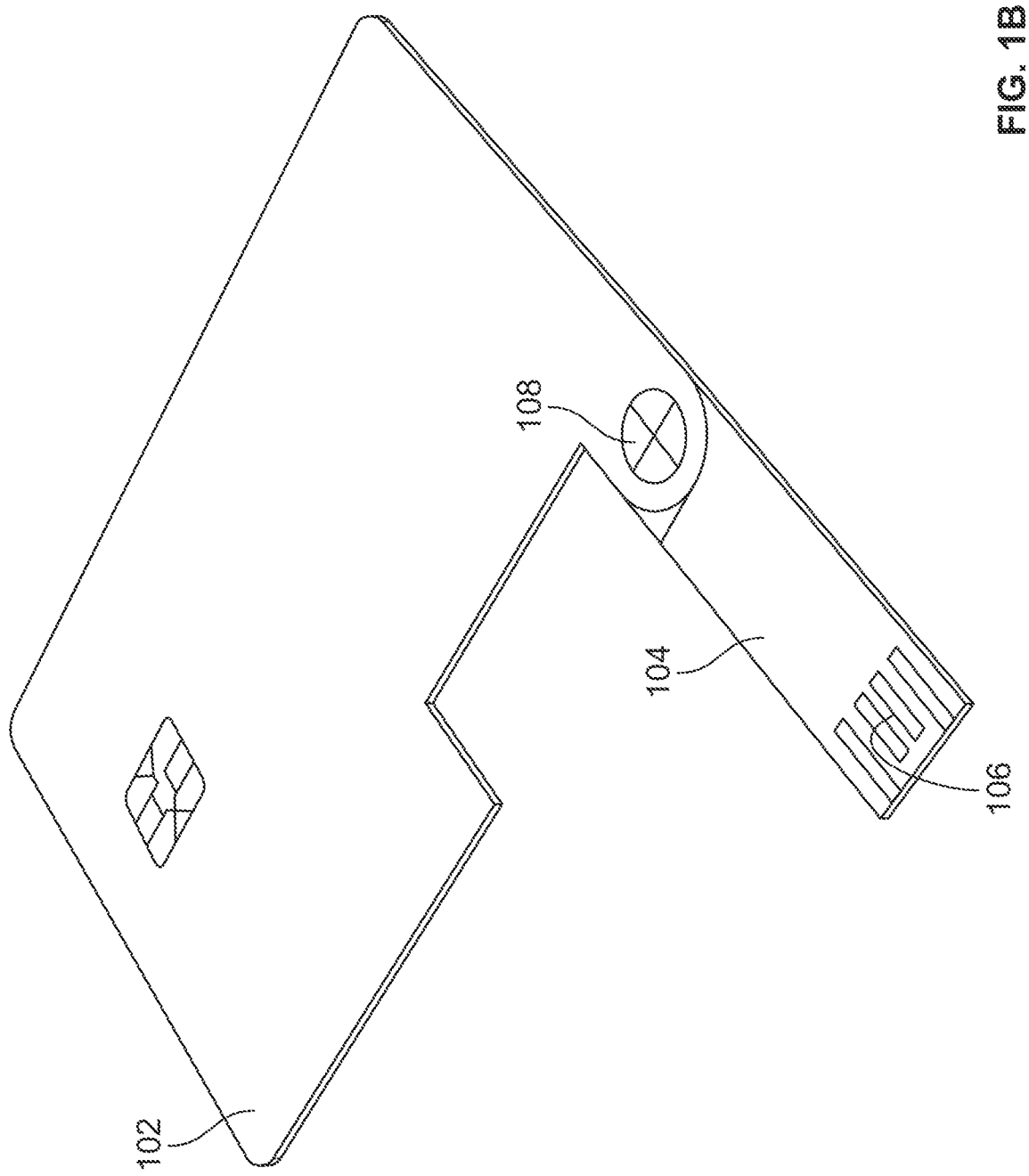
FIG. 1B illustrates an aspect of the subject matter in accordance with one embodiment.

FIG. 1B depicts the contactless card 102 with the storage device 104 in an extended position. As shown, a rotational joint 108 may allow the storage device 104 to extend and/or retract. Although the contactless card 102 depicted in FIGS. 1A-1B are in a particular configuration, embodiments are not limited in this context, as the contactless card 102 may have other suitable configurations for including a storage device 104.

Advantageously, the integrated storage device 104 is of physical dimensions such that the overall dimensions of the contactless card 102 comply with one or more of the various standards for contactless cards, for example, ISO/IEC 7810, ISO/IEC 7811, ISO/IEC 7812, ISO/IEC 7813, ISO/IEC 7816, ISO 8583, ISO/IEC 4909, and ISO/IEC 14443.

Figure 2A:
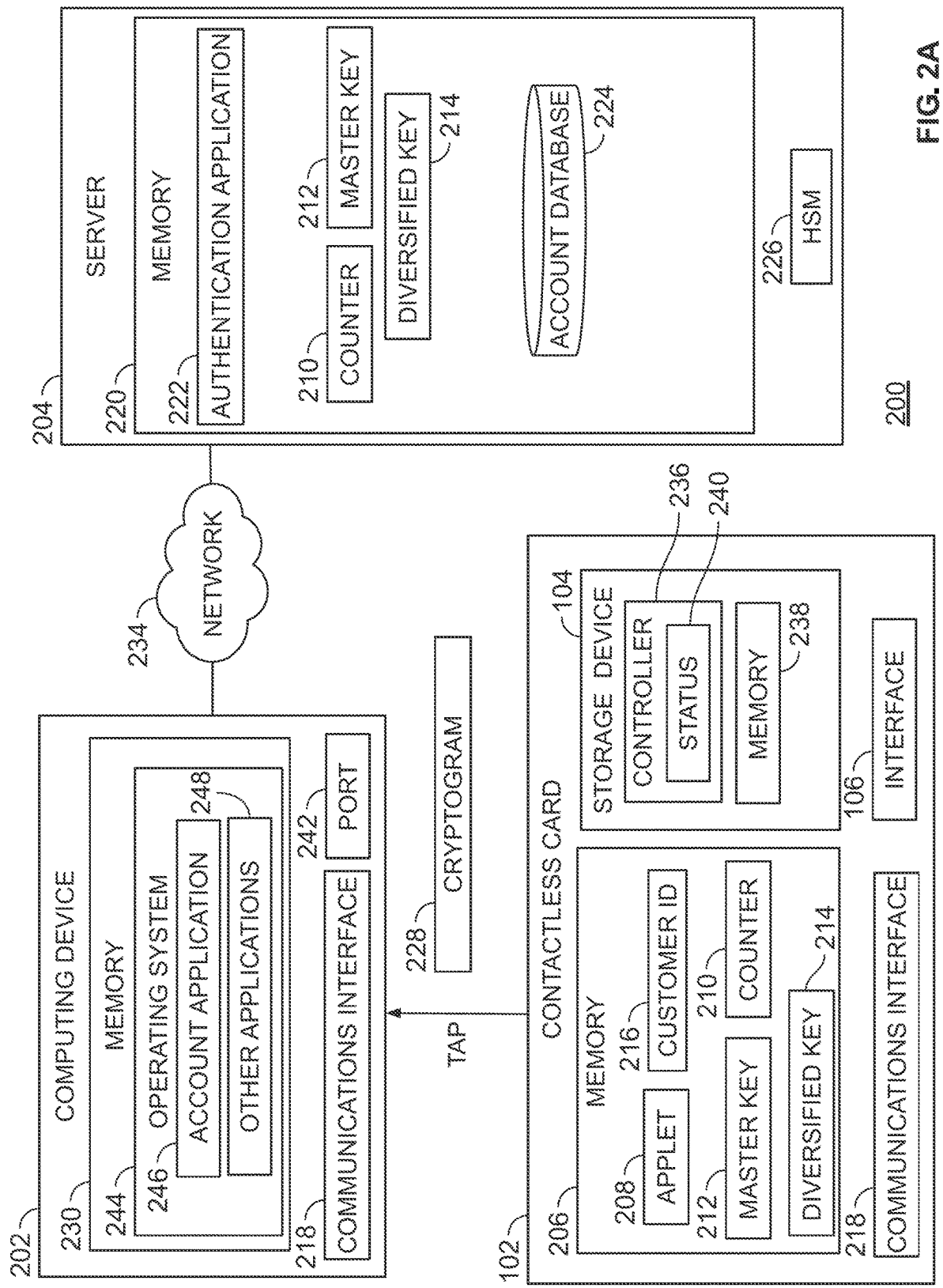
FIG. 2A illustrates an aspect of the subject matter in accordance with one embodiment.

FIG. 2A depicts an exemplary computing architecture 200, also referred to as a system, consistent with disclosed embodiments. Although the computing architecture 200 shown in FIGS. 2A-2E has a limited number of elements in a certain topology, it may be appreciated that the computing architecture 200 may include more or less elements in alternate topologies as desired for a given implementation.

The computing architecture 200 comprises one or more computing devices 202, one or more servers 204, and one or more contactless cards 102. The computing devices 202 and the servers 204 may be communicably coupled via a network 234. As shown, the contactless card 102 may comprise one or more communications interfaces 218, such as a radio frequency identification (RFID) chip, configured to communicate with a communications interface 218 (also referred to herein as a "card reader", a "wireless card reader", and/or a "wireless communications interface") of the computing devices 202 via near field communication (NFC), the EMV standard, or other short-range protocols in wireless communication. Although NFC is used as an example communications protocol herein, the disclosure is equally applicable to other types of wireless communications, such as the EMV standard, Bluetooth®, and/or Wi-Fi.

The computing device 202 is representative of any number and type of computing device, such as smartphones, tablet computers, wearable devices, laptops, portable gaming devices, virtualized computing system, merchant terminals, point-of-sale systems, servers, desktop computers, and the like. A mobile device may be herein used as an example of the computing device 202 but should not be considered limiting of the disclosure. As shown, the computing device 202 includes a wireless communications interface 218 and a port 242. The wireless communications interface 218 is representative of any type of wireless communications interface, such as RFID, Bluetooth, NFC, etc. The port 242 is any interface configured to couple to the interface 106 of the storage device 104. Examples of ports 242 include USB ports, eSATA ports, memory card slots, etc.

The server 204 is representative of any type of computing device, such as a server, workstation, compute cluster, cloud computing platform, virtualized computing system, and the like. Although not depicted for the sake of clarity, the computing device 202, contactless card 102, and server 204 each include one or more processor circuits to execute programs, code, and/or instructions.

As shown, a memory 206 of the contactless card 102 includes an applet 208, a counter 210, a master key 212, a diversified key 214, and a unique customer identifier (ID) 118. The applet 208 is executable code configured to perform the operations described herein. The counter 210, master key 212, diversified key 214, and customer ID 216 are used to provide security in the system 200 as described in greater detail below. The storage device 104 of the contactless card 102 includes a controller 236 and a memory 238. The memory 238 is representative of any type of non-volatile and non-transitory computer-readable storage media. The controller 236 generally controls access to the memory 238 of the storage device 104. As shown, the controller 236 maintains a status 240 reflecting a state of the storage device 104. For example, the state may be a locked state that restricts all operations (e.g., read, write, and/or modify), unlocked state that permits all operations, a read-only state, a read-write state, and the like. In some embodiments, the data stored in the memory 238 of the storage device 104 is encrypted and/or decrypted with the master key 212. The status 240 may be implemented in one or more non-volatile memory units to maintain the status 240 of the storage device 104 if the contactless card 102 does not continuously have sufficient power.

As shown, a memory 230 of the computing device 202 includes an instance of an operating system 244. Example operating systems include the Android® OS, iOS®, macOS®, Linux®, and Windows® operating systems. The operating system 244 includes logic and/or features to communicate with the storage device 104 via one or more ports 242 and the interface 106 of the storage device 104, e.g., according to the USB protocol or any other file transfer protocol. As shown, the operating system 244 includes an account application 246 and one or more other applications 248. The account application 246 allows users to perform various account-related operations, such as activating payment cards, viewing account balances, purchasing items, processing payments, managing files stored in the storage device 104, and the like. In some embodiments, a user may authenticate using authentication credentials to access certain features of the account application 246. For example, the authentication credentials may include a username (or login) and password, biometric credentials (e.g., fingerprints, Face ID, etc.), and the like. The other applications 248 are representative of any type of application that may read data from and/or write data to the memory 238 of the storage device 104. Examples of such applications include file browsers, web browsers, command line interfaces, and the like. As stated, the account application 246 may further include functionality similar to the other applications 248 to read, write, and/or otherwise modify data stored in the memory 238 of the storage device 104. In some embodiments, the other applications 248 include the functionality of the account application 246, e.g., to communicate with the contactless card 102 and/or server 204 for cryptographic authentication as described in greater detail herein.

As shown, a memory 220 of the server 204 includes an authentication application 222, an account database 224, and instances of the master keys 212, diversified keys 214, and counters 210 for each of a plurality of accounts and/or contactless cards 102. The account database 224 generally includes information related to an account holder (e.g., one or more users), one or more accounts of the account holder, and one or more contactless cards 102 of the account.

In some embodiments, a user may desire to perform an operation using the storage device 104. For example, the user may need to access files stored on the storage device 104, modify the files, delete the files, view a listing of files, view directory structures, write new files to the storage device, and the like. Such operations may be performed according to various protocols and/or formats, such as the USB protocol. Advantageously, the system 200 secures the data stored in the storage device 104 by requiring specific cryptographic operations to permit access to the storage device 104. The cryptographic operations may be distinct from cryptographic operations performed by the system 200 to process payments, e.g., via the EMV protocol.

To do so, the user may tap the contactless card 102 to the computing device 202 (or otherwise bring the contactless card 102 within communications range of the communications interface 218 of the device 202). The applet 208 of the contactless card 102 may then generate a cryptogram 228 to unlock the storage device 104, as the status 240 of the storage device 104 may reflect that the storage device 104 is in a locked or otherwise inaccessible state. The cryptogram 228 may be based on the customer ID 216 of the contactless card 102. The cryptogram 228 may be generated based on any suitable cryptographic technique. In some embodiments, the applet 208 may the cryptogram 228 and an unencrypted identifier (e.g., the customer ID 216, an identifier of the contactless card 102, and/or any other unique identifier) as part of a data package. In at least one embodiment, the data package is an NDEF file.

As stated, the computing architecture 200 is configured to implement key diversification to secure data, which may be referred to as a key diversification technique herein. Generally, the server 204 (or another computing device) and the contactless card 102 may be provisioned with the same master key 212 (also referred to as a master symmetric key). More specifically, each contactless card 102 is programmed with a distinct master key 212 that has a corresponding pair in the server 204. For example, when a contactless card 102 is manufactured, a unique master key 212 may be programmed into the memory 206 of the contactless card 102. Similarly, the unique master key 212 may be stored in a record of a customer associated with the contactless card 102 in the account database 224 of the server 204 (and/or stored in a different secure location, such as the hardware security module (HSM) 226). The master key 212 may be kept secret from all parties other than the contactless card 102 and server 204, thereby enhancing security of the system 200. In some embodiments, the applet 208 of the contactless card 102 may encrypt and/or decrypt data (e.g., the customer ID 216) using the master key 212 and the data as input a cryptographic algorithm. For example, encrypting the customer ID 216 with the master key 212 may result in the cryptogram 228. Similarly, the server 204 may encrypt and/or decrypt data associated with the contactless card 102 using the corresponding master key 212.

In other embodiments, the master keys 212 of the contactless card 102 and server 204 may be used in conjunction with the counters 210 to enhance security using key diversification. The counters 210 comprise values that are synchronized between the contactless card 102 and server 204. The counter 210 may comprise a number that changes each time data is exchanged between the contactless card 102 and the server 204 (and/or the contactless card 102 and the computing device 202). When preparing to send data (e.g., to the server 204 and/or the device 202), the applet 208 of the contactless card 102 may increment the counter 210. The applet 208 of the contactless card 102 may then provide the master key 212 and counter 210 as input to a cryptographic algorithm, which produces a diversified key 214 as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES107; a symmetric HMAC algorithm, such as HMAC-SHA-250; and a symmetric CMAC algorithm such as AES-CMAC. Examples of key diversification techniques are described in greater detail in U.S. patent application Ser. No. 16/205,119, filed Nov. 29, 2018. The aforementioned patent application is incorporated by reference herein in its entirety.

Continuing with the key diversification example, the applet 208 may then encrypt the data (e.g., the customer ID 216 and/or any other data) using the diversified key 214 and the data as input to the cryptographic algorithm. For example, encrypting the customer ID 216 with the diversified key 214 may result in an encrypted customer ID (e.g., a cryptogram 228). The account application 246 may then read the data package including the cryptogram 228 via the communications interface 218 of the computing device 202. Once read, the account application 246 may transmit the cryptogram 228 to the server 204 for verification.

In some embodiments, the cryptogram 228 is a parameter of a uniform resource locator (URL). For example, the URL may be "http://www.example.com/redirect?param=ABC123&custID=123". In such an example, the cryptogram 228 may correspond to the parameter "ABC123" and the customer ID 216 may correspond to the parameter "custID". In such embodiments, the computing device 202 need not have the account application 246 in the foreground when the contactless card 102 is tapped to the computing device 202. Once the URL is received by the operating system 244, the operating system 244 may open an application to process the URL. In some embodiments, the URL may be registered with the account application 246, which causes the operating system 244 to launch the account application 246 and provide the URL with the cryptogram 228 as input to the account application 246. For example, a file explorer page of the account application 246 may be opened responsive to the URL. The account application 246 may then extract the cryptogram 228 from the URL and transmit the cryptogram 228 to the server 204.

Figure 2B:
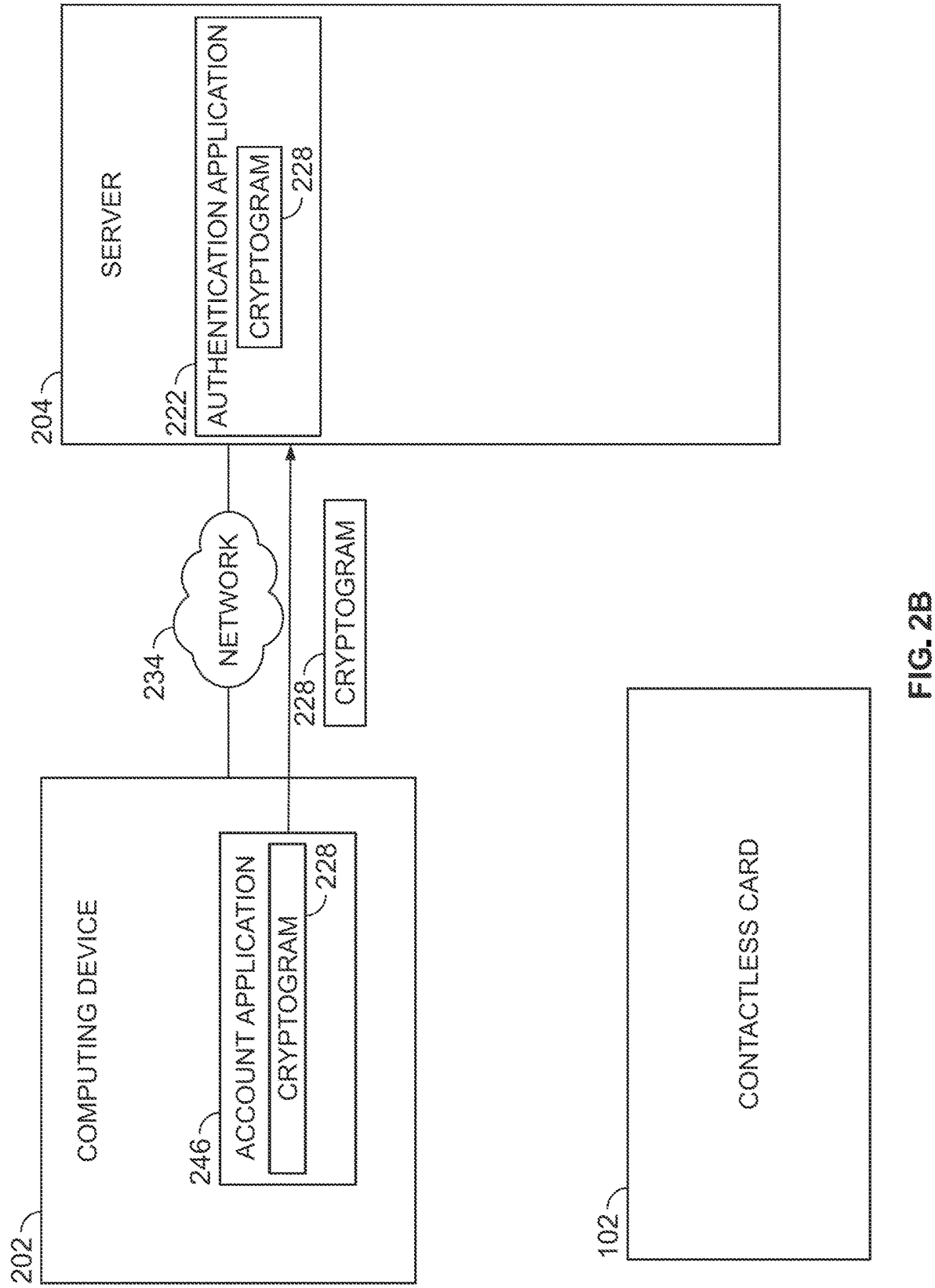
FIG. 2B illustrates an aspect of the subject matter in accordance with one embodiment.

FIG. 2B depicts an embodiment where the account application 246 transmits the cryptogram 228 to the server 204. In some embodiments, the account application 246 includes, with the cryptogram 228, an indication specifying that the cryptogram 228 is part of a request to access the storage device 104. Once received, the authentication application 222 may attempt to verify the cryptogram 228. For example, the authentication application 222 may attempt to decrypt the cryptogram 228 using a copy of the master key 212 stored by the server 204. In some embodiments, the authentication application 222 may identify the master key 212 and counter 210 using the unencrypted customer ID 216 (or other identifier) provided by the account application 246 to the server 204. In some examples, the authentication application 222 may provide the master key 212 and counter 210 as input to the cryptographic algorithm, which produces a diversified key 214 as output. The resulting diversified key 214 may correspond to the diversified key 214 of the contactless card 102, which may be used to decrypt the cryptogram 228.

Regardless of the decryption technique used, the authentication application 222 may successfully decrypt the cryptogram 228, thereby verifying or authenticating the cryptogram 228 (e.g., by comparing the customer ID 216 that is produced by decrypting the cryptogram 228 to a known customer ID stored in the account database 224, and/or based on an indication that the decryption using the master key 212 and/or diversified key 214 was successful). Although the keys 114, 116 are depicted as being stored in the memory 220, the keys may be stored elsewhere, such as in a secure element and/or the HSM 226. In such embodiments, the secure element and/or the HSM 226 may decrypt the cryptogram 228 using the master key 212 and/or diversified key 214 and a cryptographic function. Similarly, the secure element and/or HSM 226 may generate the diversified key 214 based on the master key 212 and counter 210 as described above.

If the authentication application 222 is unable to decrypt the cryptogram 228 to yield the expected result (e.g., the customer ID 216 of the account associated with the contactless card 102), the authentication application 222 does not validate the cryptogram 228. In such an example, the authentication application 222 may transmit an indication of the failed decryption to the computing device 202. Upon receipt of the indication of the failed decryption, the account application 246 may reject the requested access to the storage device 104.

Figure 2C:
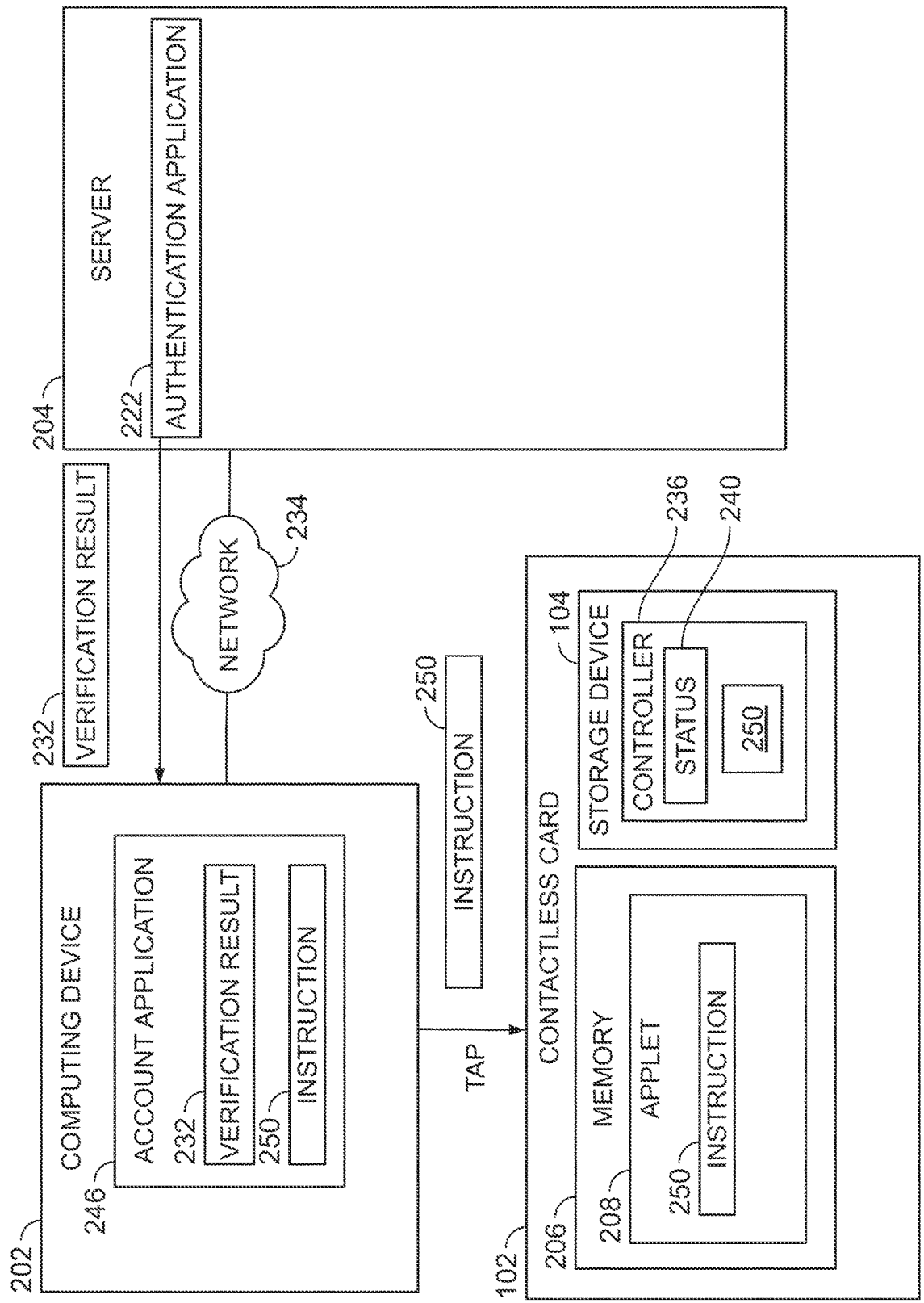
FIG. 2C illustrates an aspect of the subject matter in accordance with one embodiment.

FIG. 2C depicts an embodiment where the authentication application 222 successfully decrypts the cryptogram 228 and transmits a verification result 232 to the computing device 202. The verification result 232 generally reflects whether or not the server 204 verified and/or decrypted the cryptogram 228. In the example depicted in FIG. 2C, the verification result 232 may indicate that the server 204 decrypted or otherwise verified the cryptogram 228. Doing so may allow the account application 246 to determine that the cryptogram 228 was successfully verified. In response, the account application 246 may generate an instruction 250 to indicate that the storage device 104 should be transitioned from the locked state to an unlocked state to permit access thereto. If, however, the verification result 232 indicates the server did not verify or otherwise decrypt the cryptogram, the instruction 250 specifies to maintain the storage device 104 in the locked state to restrict the requested access to the storage device 104.

The account application 246 may then output a notification specifying to tap the contactless card 102 to the computing device 202. The account application 246 may then transmit the instruction 250 may to the contactless card 102 via the wireless communications interface. As shown, the applet 208 may receive the instruction 250 and provide the instruction 250 (or some other indication) to the controller 236. Doing so may cause the controller 236 to unlock the storage device 104. In some embodiments, the controller 236 may update the status 240 to reflect that the storage device 104 has been unlocked or is otherwise available for read and/or write access. If, however, the instruction 250 indicates to maintain the storage device 104 in the locked state, the controller 236 maintains the storage device 104 in the locked state and restricts any read/write transactions for the storage device 104. The controller 236 may transmit a confirmation to the applet 208 specifying that the instruction 250 has been implemented and the storage device 104 has been locked and/or unlocked accordingly.

Figure 2D:
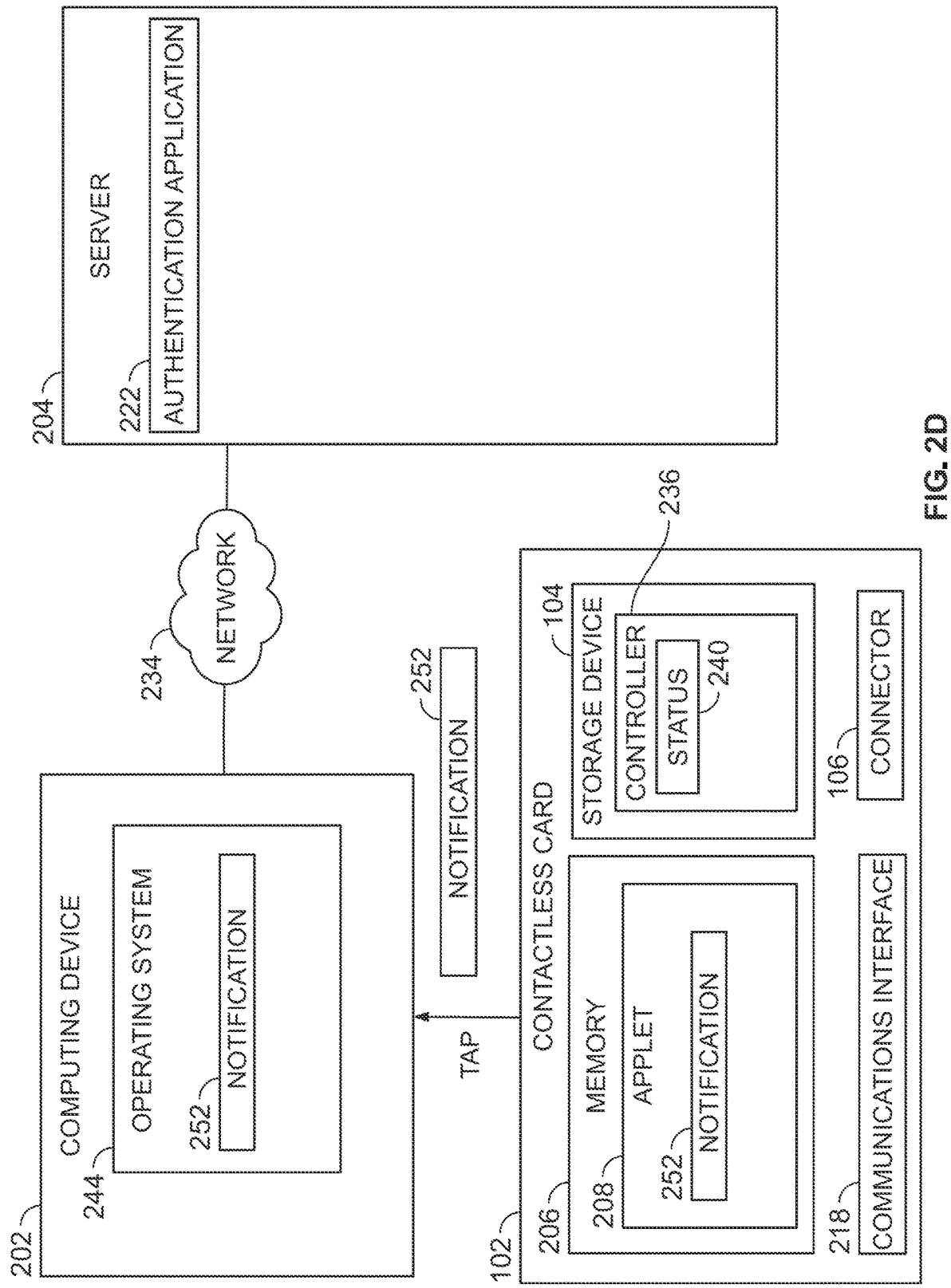
FIG. 2D illustrates an aspect of the subject matter in accordance with one embodiment.

FIG. 2D depicts an embodiment where the applet 208 transmits a notification 252 to the computing device 202 based on successfully unlocking the storage device 104. The notification 252 may generally specify that the storage device 104 was unlocked by the controller 236 and is available for read/write/modify transactions. In some embodiments, the controller 236 unlocks the storage device 104 for a predetermined amount of time, such as 1 minute, 5 minutes, etc. In such embodiments, the notification may specify this predetermined amount of time. Furthermore, the controller 236 may lock the storage device 104 upon expiration of the predetermined amount of time, e.g., when the amount of time since the storage device 104 was unlocked exceeds the predetermined amount of time. In some embodiments, the applet 208 maintains a timer tracking an amount of time since the storage device 104 was unlocked and transmits an instruction to the controller 236 specifying to lock the storage device 104 when the amount of time since the storage device 104 was unlocked exceeds the predetermined amount of time. More generally, controller 236 and/or applet 208 may include logic and/or features to implement a timer, such as logic for a clock.

Figure 2E:
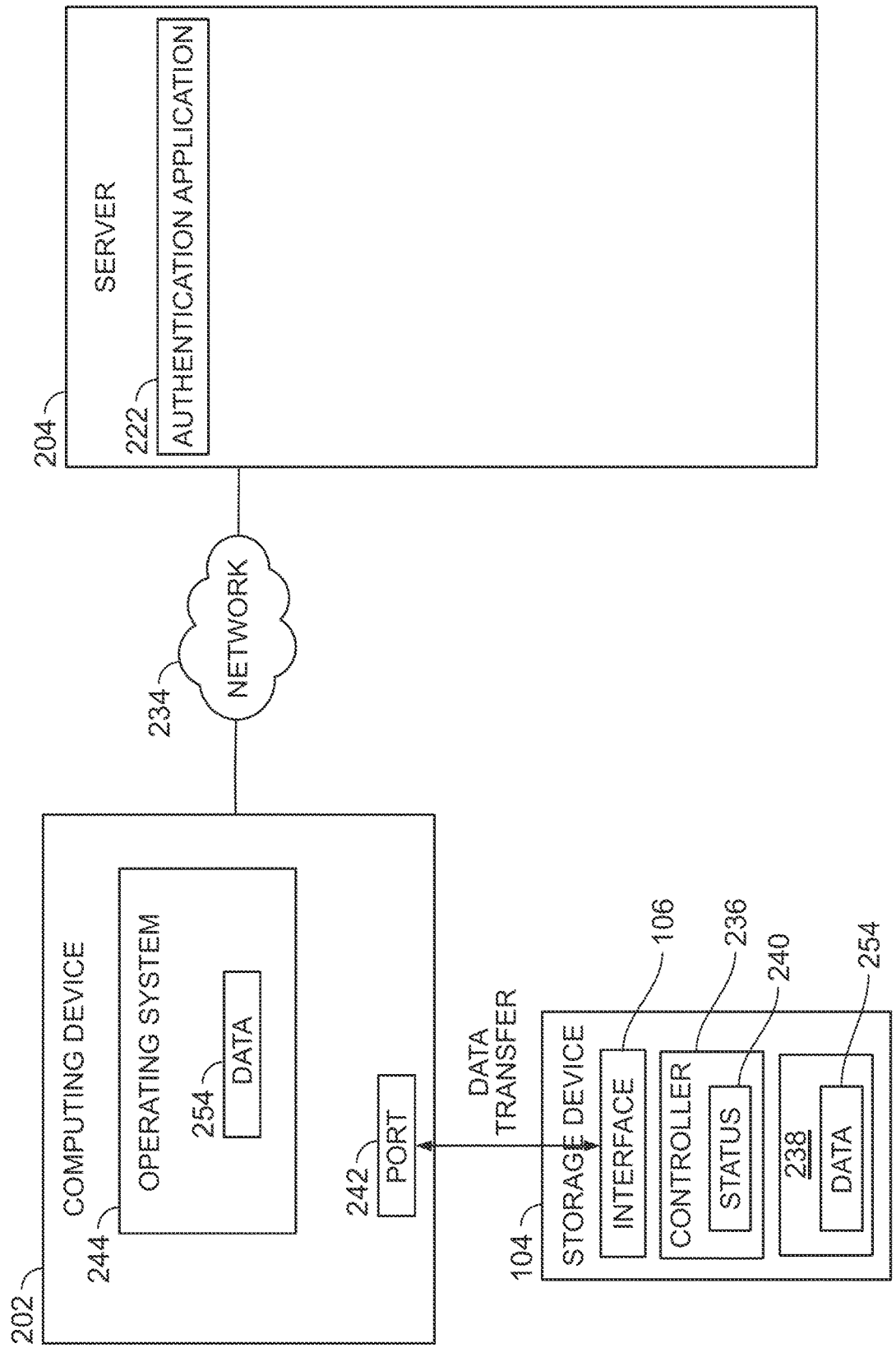
FIG. 2E illustrates an aspect of the subject matter in accordance with one embodiment.

FIG. 2E depicts an embodiment where the interface 106 of the storage device 104 is inserted into a port 242 of the computing device 202. The operating system 244 and the controller 236 may generally perform one or more operations (e.g., according to the USB protocol) to cause the controller 236 to expose the storage device 104 to the operating system 244. The one or more operations include, but are not limited to, the controller 236 verifying that the status 240 indicates that the storage device 104 is unlocked or otherwise accessible for read and/or write operations. More generally, all operations performed by the computing device 202 and the storage device 104 may be performed and/or formatted according to the USB protocol when the interface 106 is inserted into the port 242.

One or more applications (e.g., the operating system 244, account application 246, and/or other applications 248) may then generate a request to read data 254 from the storage device 104. The request may be formatted according to the USB or other protocols and may be generated responsive to user input. As shown, the data 254 may be transferred from the memory 238 of the storage device 104 to the computing device 202 according to various protocols, such as the USB protocol. Once received, the operating system 244 may provide the data to the requesting application, such as the account application 246 and/or the other applications 248. Although depicted as a read operation, the computing device 202 may also write data to the storage device 104 and/or modify data stored in the storage device 104. Similarly, although the data transfer is described using USB as a reference example, other protocols may be used for data transactions between the computing device 202 and the storage device 104.

Although the data 254 is depicted as being transferred via the interface 106, in some embodiments, the data 254 may be wirelessly communicated. For example, the controller 236 may provide the data 254 to the applet 208. The applet 208 may then wirelessly transmit the data 254 to the computing device 202 (e.g., via NFC, Bluetooth, WiFi, etc.).

Figure 3A:
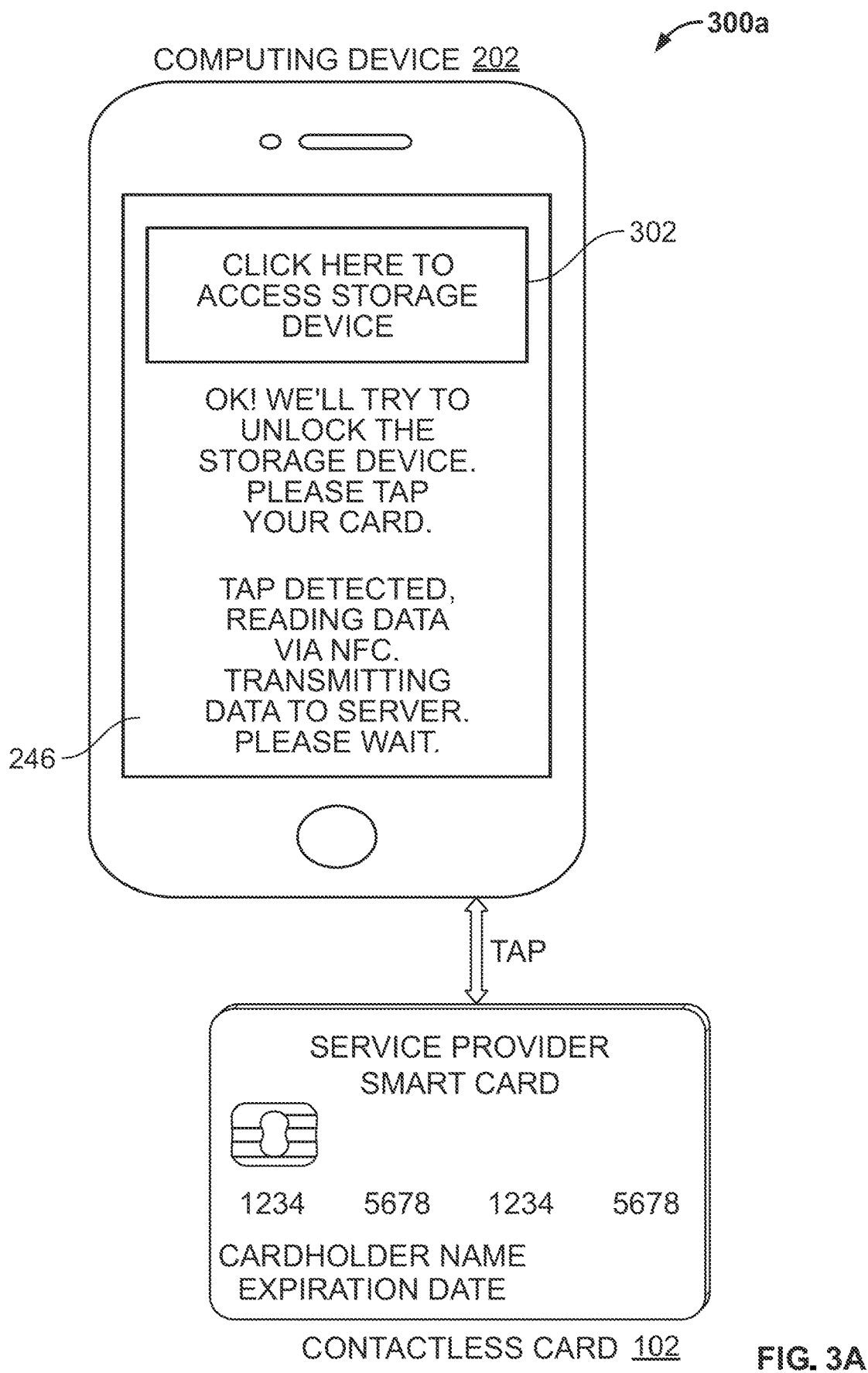
FIG. 3A illustrates an aspect of the subject matter in accordance with one embodiment.

FIG. 3A is a schematic 300a illustrating an example of cryptographic authentication of a storage device integrated in the contactless card 102, according to one embodiment. As shown, the account application 246 may include a selectable element 302 specifying to access the storage device 104. The user may select the element 302, which causes the account application 246 to instruct the user to tap the contactless card 102 to the computing device 202.

As stated, when the contactless card 102 is tapped to the computing device 202, the applet 208 may generate a cryptogram 228. In some embodiments, the cryptogram 228 is a parameter of a URL. The applet 208 may then include the cryptogram 228 and unencrypted identifier (e.g., the customer ID 216) in a data package, such as an NDEF file, that is read by the computing device 202. Responsive to receiving the data package, the account application 246 transmit the data package to the server 204 for verification.

Figure 3B:
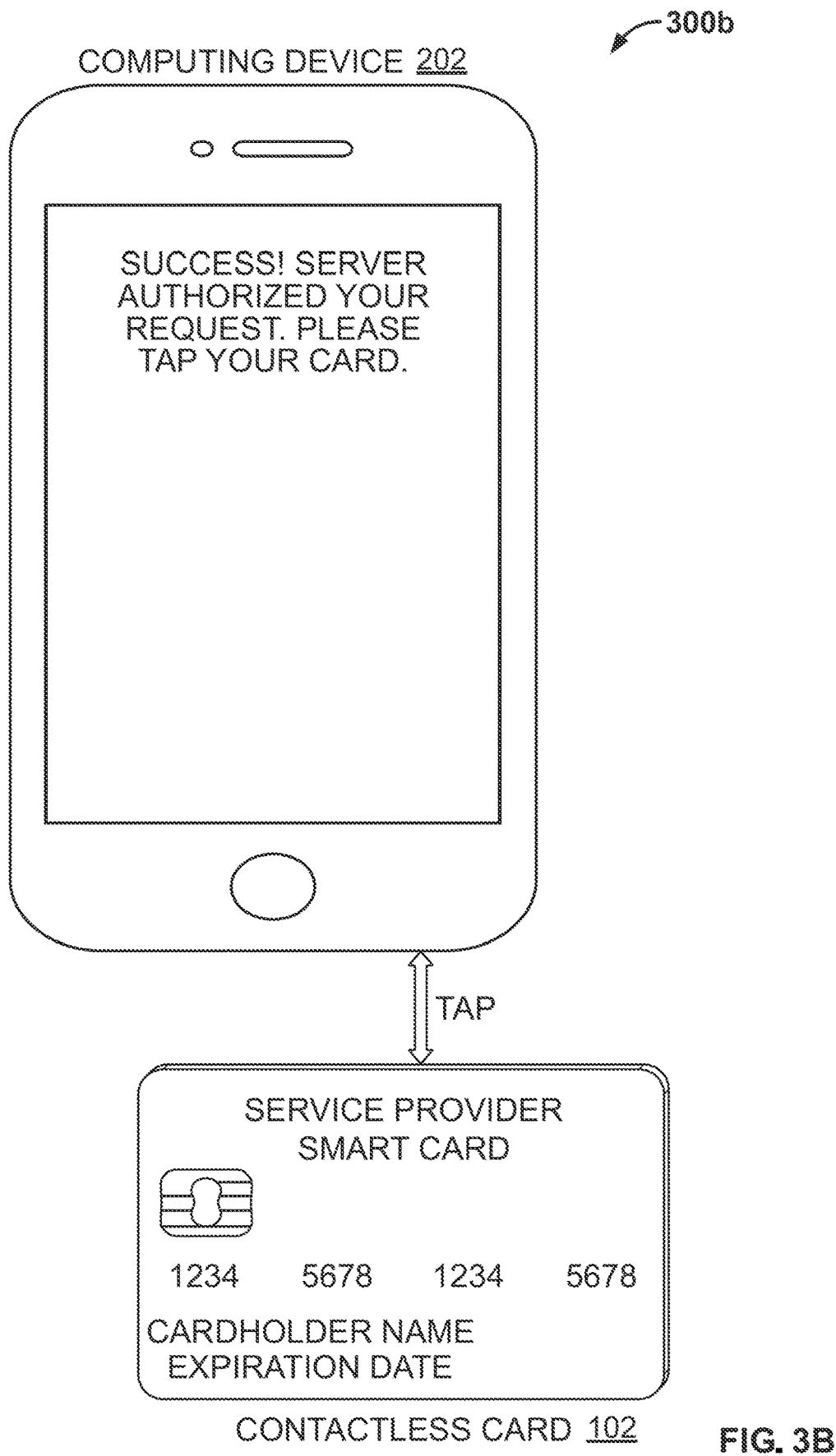
FIG. 3B illustrates an aspect of the subject matter in accordance with one embodiment.

FIG. 3B is a schematic 300b illustrating an embodiment where the account application 246 receives a verification result 232 from the server 204 specifying that the cryptogram was decrypted or otherwise verified as described in greater detail above. The account application 246 may then instruct the user to tap the contactless card 102 to the computing device 202. Doing so causes the account application 246 to transmit an instruction 250 to the contactless card 102. The instruction 250 may generally indicate that the requested access is to be permitted and the controller 236 is to unlock the storage device 104. The controller 236 may then transition the storage device 104 from the locked state to the unlocked state and store an indication of the unlocked state in the status 240. If, however, the verification result 232 indicates the cryptogram 228 is not verified, the instruction 250 indicates to restrict the requested access and the controller 236 maintains the storage device 104 in the locked state.

Figure 3C:
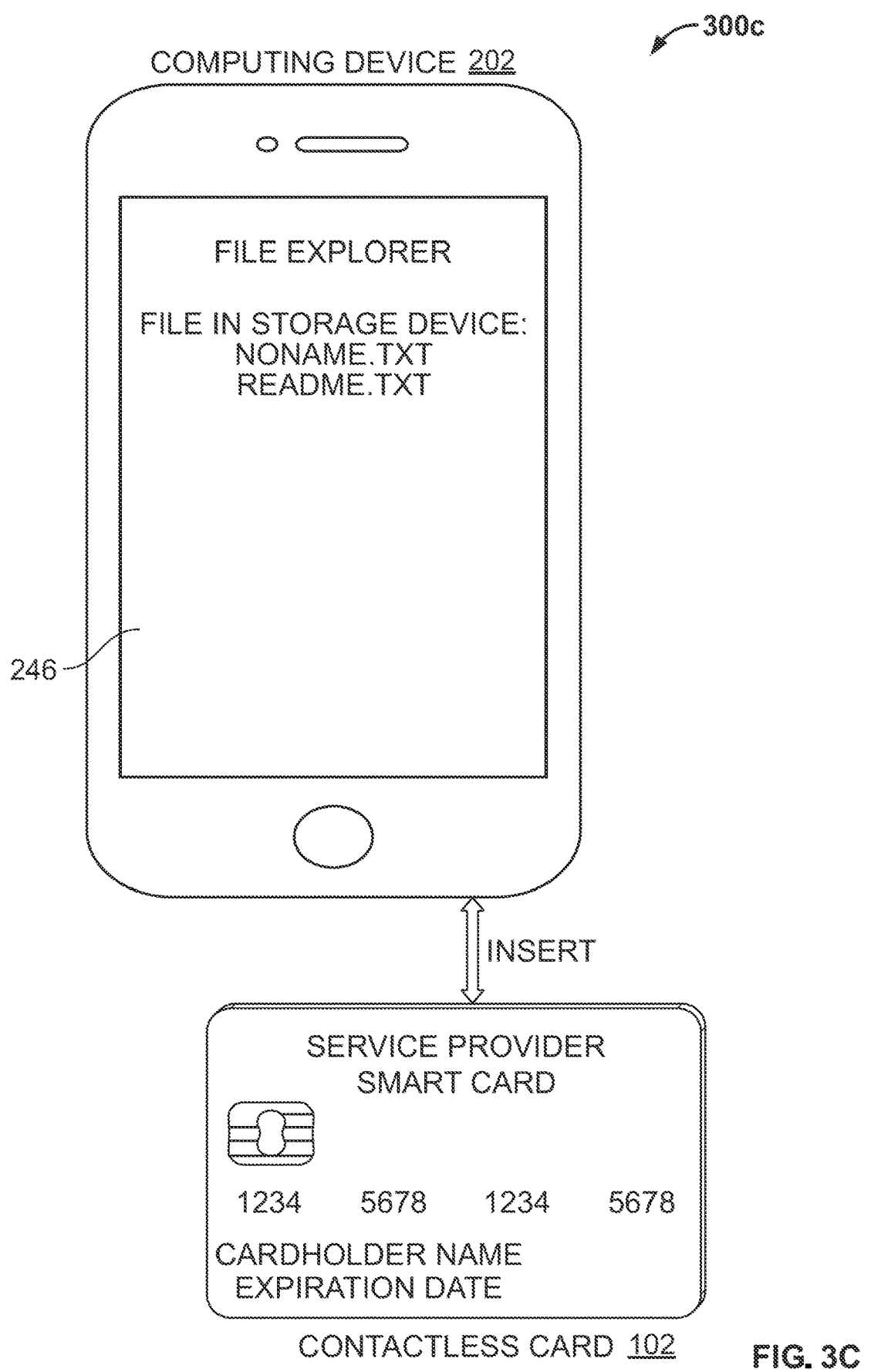
FIG. 3C illustrates an aspect of the subject matter in accordance with one embodiment.

FIG. 3C is a schematic 300c illustrating an embodiment where the interface 106 of the storage device 104 is inserted into a port 242 of the computing device 202. As shown, the account application 246 displays a file explorer page. The file explorer page may display the contents (or a portion thereof) of the memory 238 of the storage device 104. The file explorer page may generally request to view the contents of the memory 238 via the operating system 244. The controller 236 may receive the request, and determine that the status 240 of the storage device 104 permits the read operation. The controller 236 may then return the results of the read operation to the account application 246, which displays one or more files stored in the storage device 104.

Advantageously, embodiments disclosed herein only permit access to the storage device 104 based on verification of a cryptogram generated by the contactless card 102. If the server 204 is unable to decrypt or otherwise verify the cryptogram, the requested access is denied. Due to the key diversification techniques described herein, the risk of fraudulent or malicious access to the storage device 104 is significantly reduced. Doing so improves the security of the storage device 104 and any data stored therein. Furthermore, doing so improves the controller 236 by providing for advanced cryptographic management of access to the storage device 104.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. In addition, the given logic flow may be implemented by a hardware element, a software element executed by a processor, or any combination thereof. The embodiments are not limited in this context.

Figure 4:
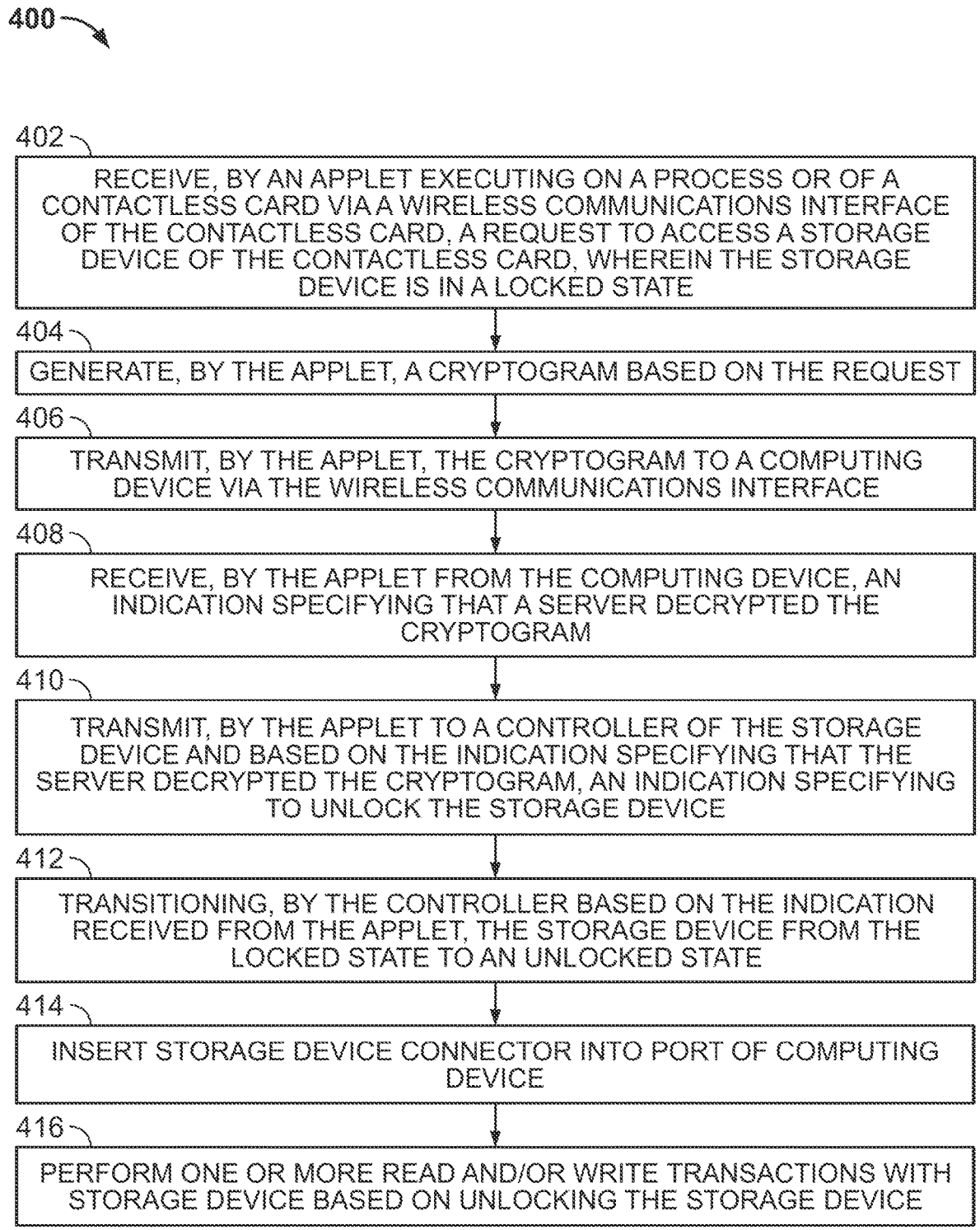
FIG. 4 illustrates a routine in accordance with one embodiment.

FIG. 4 illustrates an embodiment of a logic flow, or routine, 400. The logic flow 400 may be representative of some or all of the operations executed by one or more embodiments described herein. For example, the logic flow 400 may include some or all of the operations for cryptographically controlling access to the storage device 104 of the contactless card 102. Embodiments are not limited in this context.

In block 402, routine 400 receives, by an applet 208 executing on a processor of a contactless card 102 via a wireless communications interface 218 of the contactless card 102, a request to access a storage device 104 of the contactless card 102, wherein the storage device 104 is in a locked state (e.g., based on the status 240 indicating the storage device 104 is in a locked state). The request may be received from a computing device 202. In block 404, routine 400 generates, by the applet 208, a cryptogram 228 based on the request. In block 406, routine 400 transmits, by the applet 208, the cryptogram 228 to the computing device 202 via the wireless communications interface 218. In block 408, routine 400 receives, by the applet 208 from the computing device 202, an indication specifying that a server 204 verified the cryptogram 228.

In block 410, routine 400 transmits, by the applet 208 to a controller 236 of the storage device 104 and based on the indication specifying that the server 204 verified the cryptogram 228, an indication specifying to unlock the storage device 104. In block 412, routine 400 transitions, by the controller 236 based on the indication received from the applet 208, the storage device 104 from the locked state to an unlocked state. Doing so allows data to be read from and/or written to the memory 238 of the storage device 104. Similarly, other transactions may be permitted, such as deleting files, moving files, etc. For example, when the storage device 104 is inserted into a port 242 at block 414, the controller 236 may expose the storage device 104 to the computing device 202. At block 416, the controller 236 may permit requested operations for the storage device 104 (e.g., read/write/modify operations) based on the status 240 indicating the storage device 104 is accessible.

FIG. 5 illustrates an embodiment of a logic flow, or routine, 500. The logic flow 500 may be representative of some or all of the operations executed by one or more embodiments described herein. For example, the logic flow 500 may include some or all of the operations for cryptographically controlling access to the storage device 104 of the contactless card 102. Embodiments are not limited in this context.

In block 502, routine 500 receives, by an applet 208 executing on a processor of a contactless card 102 via a wireless communications interface 218 of the contactless card 102, a request to lock a storage device 104 of the contactless card 102, wherein the storage device 104 is in an unlocked state. The request may be received from a computing device 202. In block 504, routine 500 generates, by the applet 208, a cryptogram 228 based on the request. In block 506, routine 500 transmits, by the applet 208, the cryptogram 228 to the computing device 202 via the wireless communications interface. In block 508, routine 500 receives, by the applet 208 from the computing device 202, an indication specifying that the server 204 decrypted the cryptogram 228.

In block 510, routine 500 transmits, by the applet 208 to a controller 236 of the storage device 104 and based on the indication specifying that the server 204 decrypted the cryptogram 228, an indication specifying to lock the storage device 104. In block 512, routine 500 transitions, by the controller 236 based on the indication received from the applet 208, the storage device 104 from the unlocked state to a locked state. In block 514, routine 500 receives, by the applet 208, a request to access the storage device 104. The access may be a read access, write access, or any other type of access. In block 516, routine 500 determines, by the applet 208, the status 240 of the storage device 104 from the controller 236. In block 518, routine 500 rejects, by the applet 208 and/or the controller 236, the request based on the status 240 indicating the storage device 104 is in a locked state. For example, when the storage device 104 is inserted into a port 242, the controller 236 may restrict the storage device 104 from being exposed to the computing device 202 and reject any requested operations based on the status 240 indicating the storage device 104 is locked or otherwise not accessible.

Figure 6A:
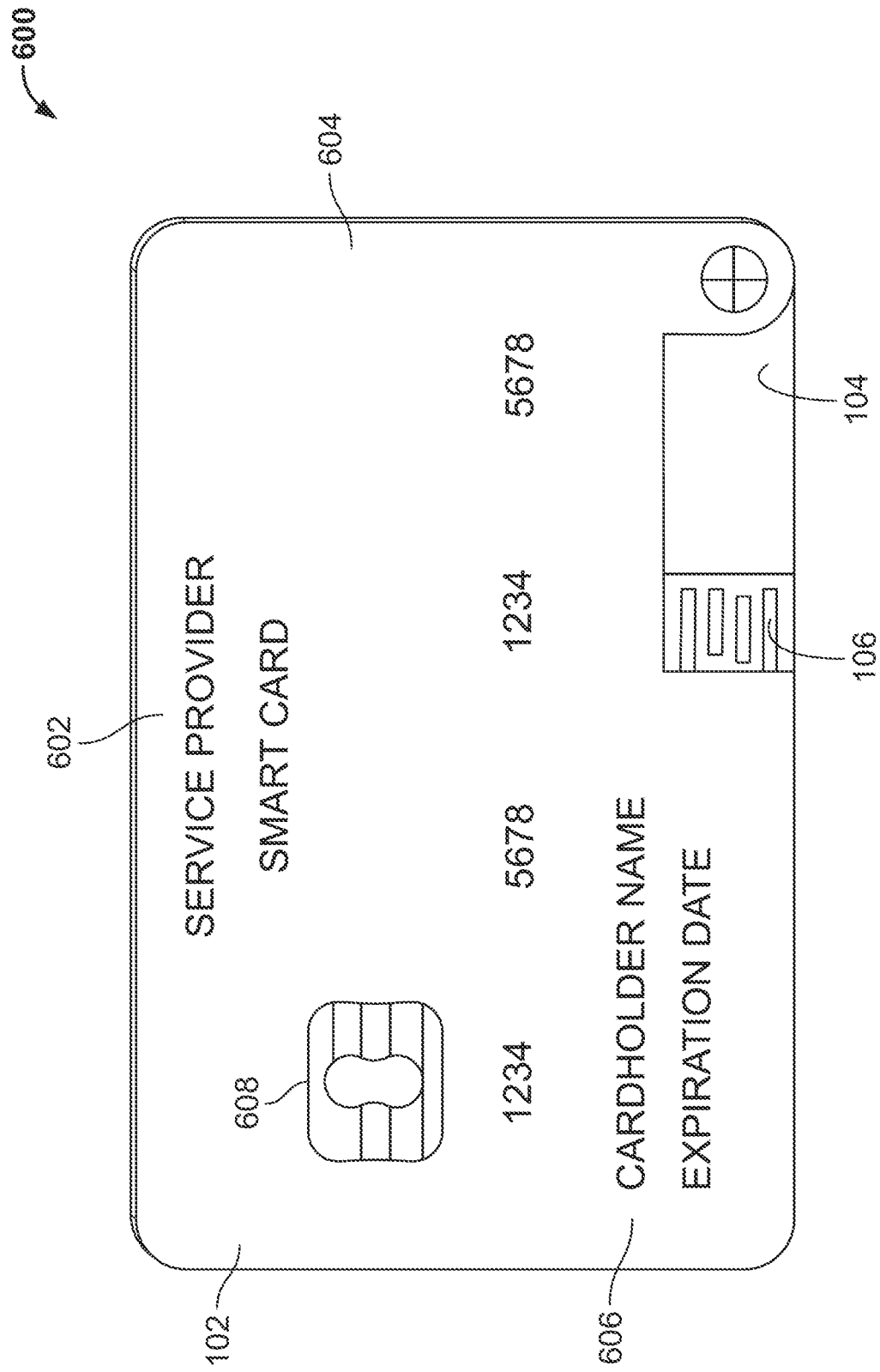
FIG. 6A illustrates a contactless card in accordance with one embodiment.

FIG. 6A is a schematic 600 illustrating an example configuration of a contactless card 102, which may include a payment card, such as a credit card, debit card, or gift card, issued by a service provider as displayed as service provider indicia 602 on the front or back of the contactless card 102. In some examples, the contactless card 102 is not related to a payment card, and may include, without limitation, an identification card. In some examples, the transaction card may include a dual interface contactless payment card, a rewards card, and so forth. The contactless card 102 may include a substrate 604, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 102 may have physical characteristics compliant with the ID-1 format of the ISO/IEC 7816 standard, and the transaction card may otherwise be compliant with the ISO/IEC 14443 standard. However, it is understood that the contactless card 102 according to the present disclosure may have different characteristics, and the present disclosure does not require a transaction card to be implemented in a payment card.

The contactless card 102 may also include identification information 606 displayed on the front and/or back of the card, and a contact pad 608. The contact pad 608 may include one or more pads and be configured to establish contact with another client device, such as an ATM, a user device, smartphone, laptop, desktop, or tablet computer via transaction cards. The contact pad may be designed in accordance with one or more standards, such as ISO/IEC 7816 standard, and enable communication in accordance with the EMV protocol. The contactless card 102 may also include processing circuitry, antenna and other components as will be further discussed in FIG. 6B. These components may be located behind the contact pad 608 or elsewhere on the substrate 604, e.g. within a different layer of the substrate 604, and may electrically and physically coupled with the contact pad 608. The contactless card 102 may also include a magnetic strip or tape, which may be located on the back of the card (not shown in FIG. 6A). The contactless card 102 may also include a Near-Field Communication (NFC) device coupled with an antenna capable of communicating via the NFC protocol. Embodiments are not limited in this manner.

Figure 6B:
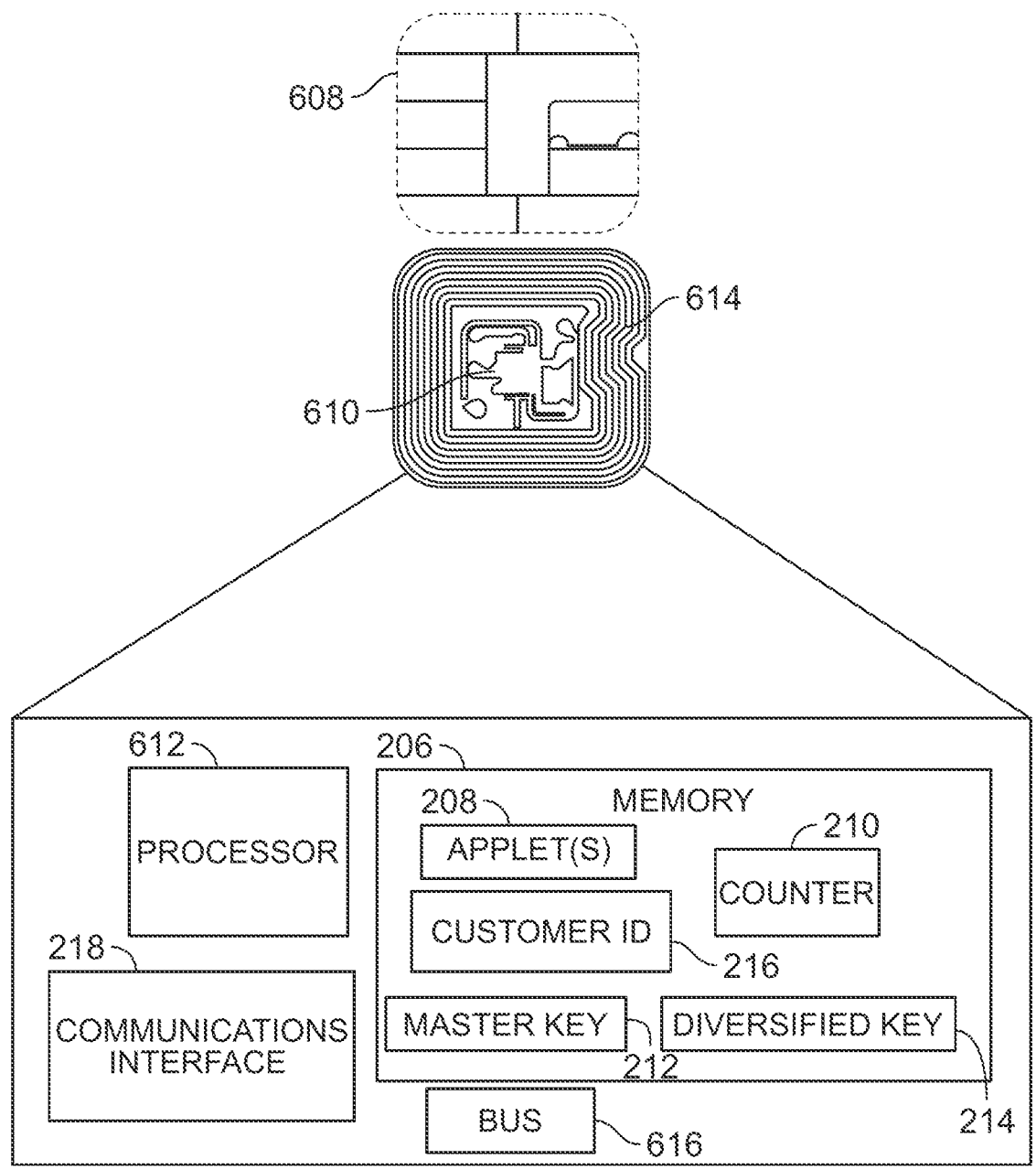
FIG. 6B illustrates a contactless card in accordance with one embodiment.

As illustrated in FIG. 6B, the contact pad 608 of contactless card 102 may include processing circuitry 610 for storing, processing, and communicating information, including a processor 612, a memory 206, and one or more communications interface 218. It is understood that the processing circuitry 610 may contain additional components, including processors, memories, error and parity/CRC checkers, data encoders, anticollision algorithms, controllers, command decoders, security primitives and tamper proofing hardware, as necessary to perform the functions described herein.

The memory 206 may be a read-only memory, write-once read-multiple memory or read/write memory, e.g., RAM, ROM, and EEPROM, and the contactless card 102 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 206 may be encrypted memory utilizing an encryption algorithm executed by the processor 612 to encrypt data. In some embodiments, the data stored in the storage device 104 is encrypted using an encryption algorithm executed by the processor 612 and/or the controller 236 to encrypt data. A communications bus 616 may couple the controller 236, the storage device 104, and the processing circuitry 610 of the contact pad 608.

The memory 206 may be configured to store one or more applet 208, one or more counters 210, a customer ID 216, the master key 212, and the diversified key 214. The one or more applet 208 may comprise one or more software applications configured to execute on one or more contactless cards 102, such as a Java® Card applet. However, it is understood that applet 208 are not limited to Java Card applets, and instead may be any software application operable on contactless cards or other devices having limited memory. The one or more counter 210 may comprise a numeric counter sufficient to store an integer. The customer ID 216 may comprise a unique alphanumeric identifier assigned to a user of the contactless card 102, and the identifier may distinguish the user of the contactless card 102 from other users of other contactless cards 102. In some examples, the customer ID 216 may identify both a customer and an account assigned to that customer and may further identify the contactless card 102 associated with the customer's account.

The processor 612 and memory elements of the foregoing exemplary embodiments are described with reference to the contact pad 608, but the present disclosure is not limited thereto. It is understood that these elements may be implemented outside of the contact pad 608 or entirely separate from it, or as further elements in addition to processor 612 and memory 206 elements located within the contact pad 608.

In some examples, the contactless card 102 may comprise one or more antenna(s) 614. The one or more antenna(s) 614 may be placed within the contactless card 102 and around the processing circuitry 610 of the contact pad 608. For example, the one or more antenna(s) 614 may be integral with the processing circuitry 610 and the one or more antenna(s) 614 may be used with an external booster coil. As another example, the one or more antenna(s) 614 may be external to the contact pad 608 and the processing circuitry 610.

In an embodiment, the coil of contactless card 102 may act as the secondary of an air core transformer. The terminal may communicate with the contactless card 102 by cutting power or amplitude modulation. The contactless card 102 may infer the data transmitted from the terminal using the gaps in the power connection of the contactless card 102, which may be functionally maintained through one or more capacitors. The contactless card 102 may communicate back by switching a load on the coil of the contactless card 102 or load modulation. Load modulation may be detected in the terminal's coil through interference. More generally, using the antenna(s) 614, processor 612, and/or the memory 206, the contactless card 102 provides a communications interface to communicate via NFC, Bluetooth, and/or Wi-Fi communications.

As explained above, contactless card 102 may be built on a software platform operable on smart cards or other devices having limited memory, such as JavaCard, and one or more or more applications or applets may be securely executed. Applet 208 may be added to contactless cards to provide a one-time password (OTP) for multifactor authentication (MFA) in various mobile application-based use cases. Applet 208 may be configured to respond to one or more requests, such as near field data exchange requests, from a reader, such as a mobile NFC reader (e.g., of a mobile computing device 202 or point-of-sale terminal), and produce an NDEF message that comprises a cryptographically secure OTP encoded as an NDEF text tag. The NDEF message may include the cryptogram 228, and any other data, such as data stored in the storage device 104.

One example of an NDEF OTP is an NDEF short-record layout (SR=1). In such an example, one or more applet 208 may be configured to encode the OTP as an NDEF type 4 well known type text tag. In some examples, NDEF messages may comprise one or more records. The applet 208 may be configured to add one or more static tag records in addition to the OTP record.

In some examples, the one or more applet 208 may be configured to emulate an RFID tag. The RFID tag may include one or more polymorphic tags. In some examples, each time the tag is read, different cryptographic data is presented that may indicate the authenticity of the contactless card. Based on the one or more applet 208, an NFC read of the tag may be processed, the data may be transmitted to a server, such as a server of a banking system, and the data may be validated at the server.

In some examples, the contactless card 102 and server may include certain data such that the card may be properly identified. The contactless card 102 may include one or more unique identifiers (not pictured). Each time a read operation takes place, the counter 210 may be configured to increment. In some examples, each time data from the contactless card 102 is read (e.g., by a mobile device), the counter 210 is transmitted to the server for validation and determines whether the counter 210 are equal (as part of the validation) to a counter of the server.

The one or more counter 210 may be configured to prevent a replay attack. For example, if a cryptogram has been obtained and replayed, that cryptogram is immediately rejected if the counter 210 has been read or used or otherwise passed over. If the counter 210 has not been used, it may be replayed. In some examples, the counter that is incremented on the contactless card 102 is different from the counter that is incremented for transactions. The contactless card 102 is unable to determine the application transaction counter 210 since there is no communication between applets 208 on the contactless card 102. In some examples, the contactless card 102 may comprise a first applet 440-1, which may be a transaction applet, and a second applet 440-2. Each applet 440-1 and 440-2 may comprise a respective counter 210.

In some examples, the counter 210 may get out of sync. In some examples, to account for accidental reads that initiate transactions, such as reading at an angle, the counter 210 may increment but the application does not process the counter 210. In some examples, when the mobile device 10 is woken up, NFC may be enabled and the computing device 202 may be configured to read available tags, but no action is taken responsive to the reads.

To keep the counter 210 in sync, an application, such as a background application, may be executed that would be configured to detect when the computing device 202 wakes up and synchronize with the server of a banking system indicating that a read that occurred due to detection to then move the counter 210 forward. In other examples, Hashed One Time Password may be utilized such that a window of mis-synchronization may be accepted. For example, if within a threshold of 10, the counter 210 may be configured to move forward. But if within a different threshold number, for example within 10 or 1000, a request for performing re-synchronization may be processed which requests via one or more applications that the user tap, gesture, or otherwise indicate one or more times via the user's device. If the counter 210 increases in the appropriate sequence, then it possible to know that the user has done so.

The key diversification technique described herein with reference to the counter 210, master key, and diversified key, is one example of encryption and/or decryption a key diversification technique. This example key diversification technique should not be considered limiting of the disclosure, as the disclosure is equally applicable to other types of key diversification techniques.

During the creation process of the contactless card 102, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 102. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 102 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

Figure 7:
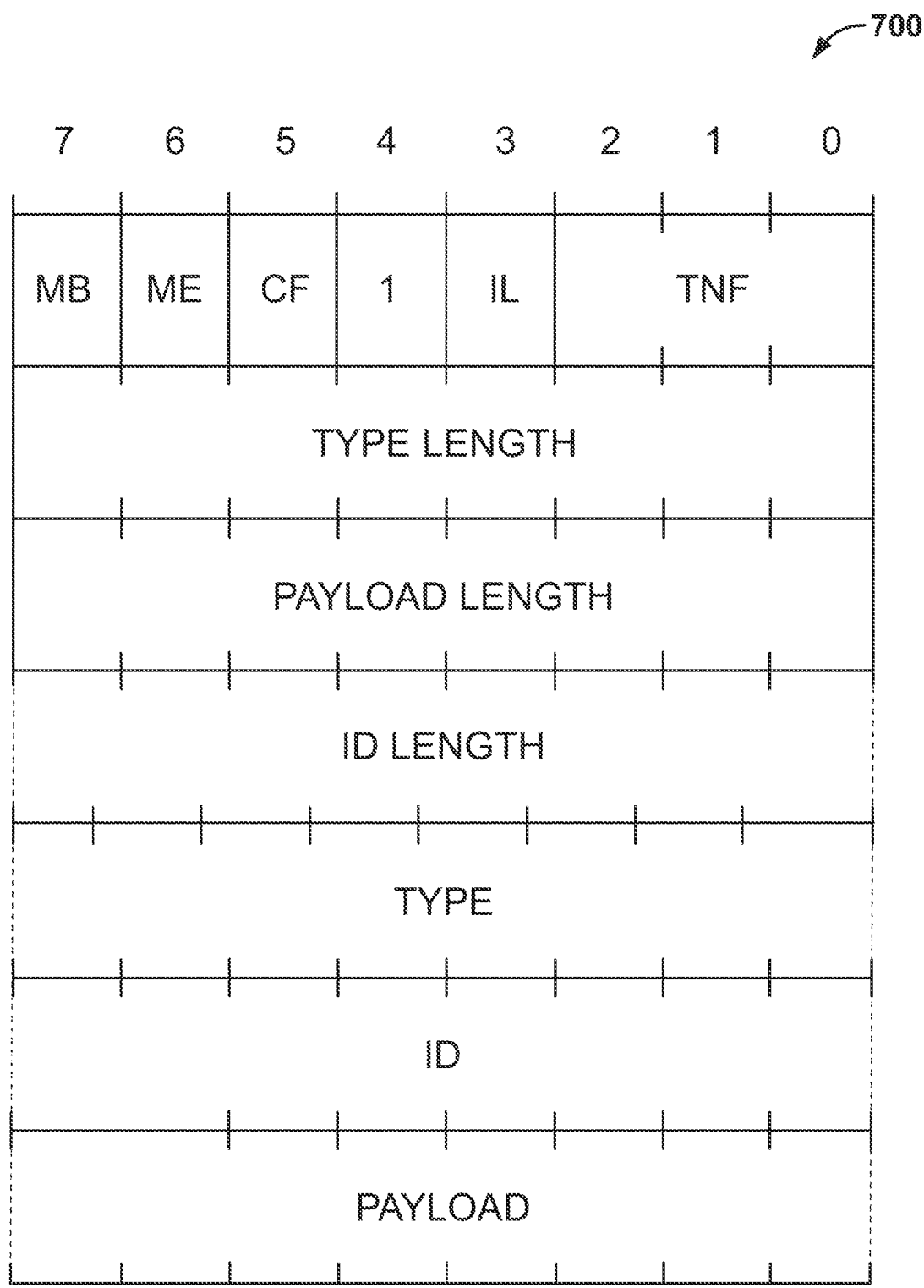
FIG. 7 illustrates a data structure in accordance with one embodiment.

FIG. 7 illustrates an NDEF short-record layout (SR=1) data structure 700 according to an example embodiment. One or more applets may be configured to encode the OTP as an NDEF type 4 well known type text tag. In some examples, NDEF messages may comprise one or more records. The applets may be configured to add one or more static tag records in addition to the OTP record. Exemplary tags include, without limitation, Tag type: well known type, text, encoding English (en); Applet ID: D2760000850101; Capabilities: read-only access; Encoding: the authentication message may be encoded as ASCII hex; type-length-value (TLV) data may be provided as a personalization parameter that may be used to generate the NDEF message. In an embodiment, the authentication template may comprise the first record, with a well-known index for providing the actual dynamic authentication data. The data structure 700 may include the cryptogram 228, and any other data provided by the applet 208.

Figure 8:
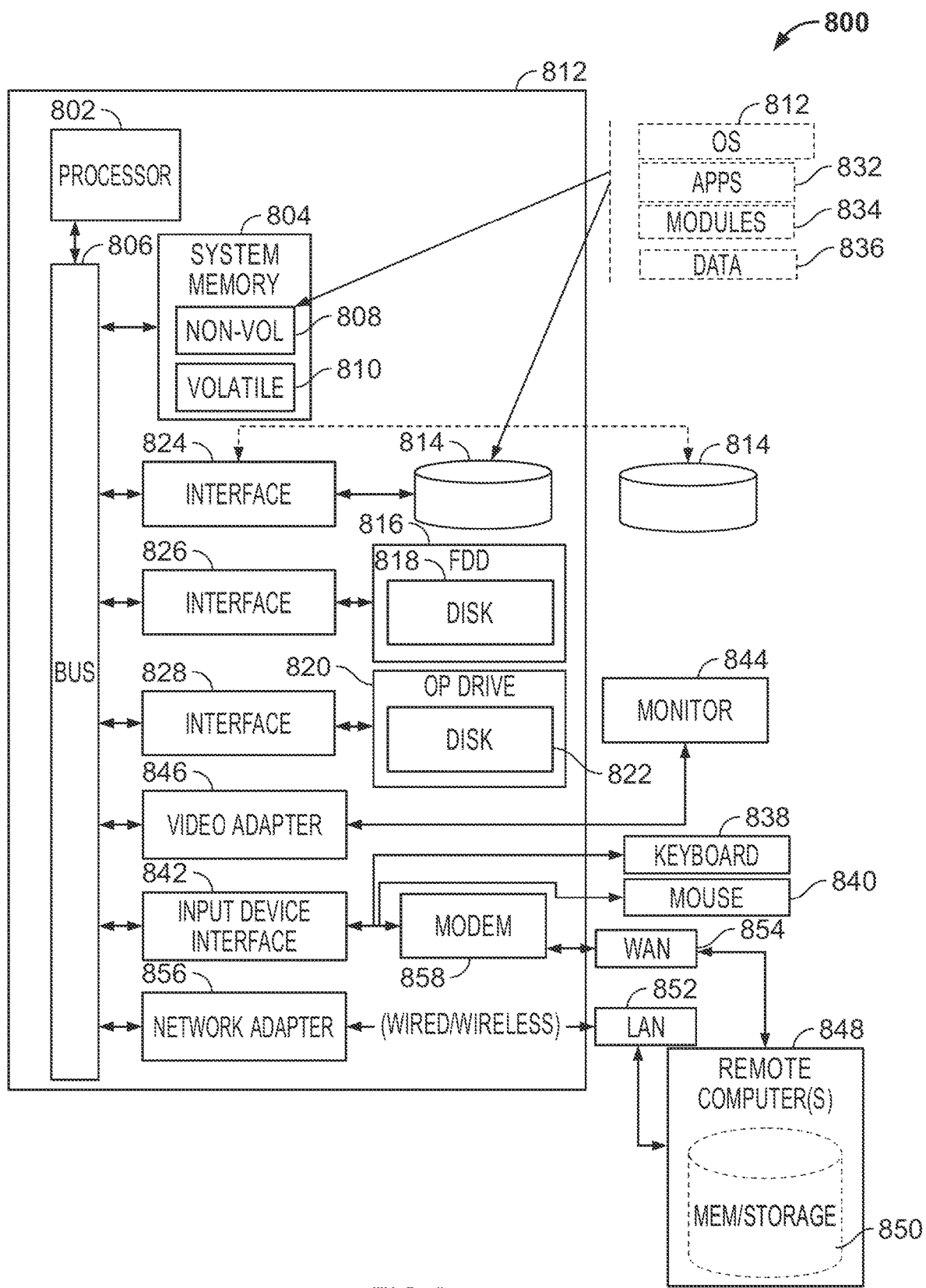
FIG. 8 illustrates a computer architecture in accordance with one embodiment.

FIG. 8 illustrates an embodiment of an exemplary computer architecture 800 suitable for implementing various embodiments as previously described. In one embodiment, the computer architecture 800 may include or be implemented as part of computing architecture 200.

As used in this application, the terms "system" and "component" are intended to refer to a computer-related entity, either hardware, a combination of hardware and software, software, or software in execution, examples of which are provided by the exemplary computing computer architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computer architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 500.

As shown in FIG. 8, the computer architecture 800 includes a computer 812 comprising a processor 802, a system memory 804 and a system bus 806. The processor 802 can be any of various commercially available processors. The computer 812 may be representative of the computing device 202 and/or the server 204.

The system bus 806 provides an interface for system components including, but not limited to, the system memory 804 to the processor 802. The system bus 806 can be any of several types of bus structure that may further interconnect to a memory bus (with or without a memory controller), a peripheral bus, and a local bus using any of a variety of commercially available bus architectures. Interface adapters may connect to the system bus 806 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computer architecture 800 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 804 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 804 can include non-volatile 808 and/or volatile 810. A basic input/output system (BIOS) can be stored in the non-volatile 808.

The computer 812 may include various types of computer-readable storage media in the form of one or more lower speed memory units, including an internal (or external) hard disk drive 814, a magnetic disk drive 816 to read from or write to a removable magnetic disk 818, and an optical disk drive 820 to read from or write to a removable optical disk 822 (e.g., a CD-ROM or DVD). The hard disk drive 814, magnetic disk drive 816 and optical disk drive 820 can be connected to system bus 806 the by an HDD interface 824, and FDD interface 826 and an optical disk drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 808, and volatile 810, including an operating system 830, one or more applications 832, other program modules 834, and program data 836. In one embodiment, the one or more applications 832, other program modules 834, and program data 836 can include, for example, the various applications and/or components of the system 200.

A user can enter commands and information into the computer 812 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 802 through an input device interface 842 that is coupled to the system bus 806 but can be connected by other interfaces such as a parallel port, IEEE 1394 serial port, a game port, a USB port, an IR interface, and so forth.

A monitor 844 or other type of display device is also connected to the system bus 806 via an interface, such as a video adapter 846. The monitor 844 may be internal or external to the computer 812. In addition to the monitor 844, a computer typically includes other peripheral output devices, such as speakers, printers, and so forth.

The computer 812 may operate in a networked environment using logical connections via wire and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all the elements described relative to the computer 812, although, for purposes of brevity, only a memory and/or storage device 850 is illustrated. The logical connections depicted include wire/wireless connectivity to a local area network 852 and/or larger networks, for example, a wide area network 854. Such LAN and WAN networking environments are commonplace in offices and companies, and facilitate enterprise-wide computer networks, such as intranets, all of which may connect to a global communications network, for example, the Internet.

When used in a local area network 852 networking environment, the computer 812 is connected to the local area network 852 through a wire and/or wireless communication network interface or network adapter 856. The network adapter 856 can facilitate wire and/or wireless communications to the local area network 852, which may also include a wireless access point disposed thereon for communicating with the wireless functionality of the network adapter 856.

When used in a wide area network 854 networking environment, the computer 812 can include a modem 858, or is connected to a communications server on the wide area network 854 or has other means for establishing communications over the wide area network 854, such as by way of the Internet. The modem 858, which can be internal or external and a wire and/or wireless device, connects to the system bus 806 via the input device interface 842. In a networked environment, program modules depicted relative to the computer 812, or portions thereof, can be stored in the remote memory and/or storage device 850. It will be appreciated that the network connections shown are exemplary and other means of establishing a communications link between the computers can be used.

The computer 812 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, ac, ax, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-7 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A contactless card, comprising:
 a processor circuit; and
 a storage device comprising a controller;
 a memory storing instructions which when executed by the processor circuit, cause the processor circuit to:
  receive a request to access the storage device, wherein the storage device is in a locked state;
  generate a cryptogram based on the request;
  transmit the cryptogram to a computing device via a wireless communications interface;
  receive, from the computing device, an indication specifying that a server decrypted the cryptogram; and
  transmit, to the controller based on the indication specifying that the server decrypted the cryptogram, an indication specifying to unlock the storage device, wherein the controller transitions the storage device from the locked state to an unlocked state based on the indication.

2. The contactless card of claim 1, the memory storing instructions which when executed by the processor circuit, cause the processor circuit to:
 receive another request specifying to lock the storage device;
 generate another cryptogram;
 transmit the another cryptogram to the computing device;
 receive, from the computing device, an indication specifying that the server decrypted the another cryptogram; and
 transmit, to the controller based on the indication specifying that the server decrypted the another cryptogram, an indication specifying to lock the storage device, wherein the controller transitions the storage device from the unlocked state to the locked state based on the indication to lock the storage device.

3. The contactless card of claim 1, wherein the controller is configured to:
 determine that an amount of time elapsed subsequent to unlocking the storage device exceeds a threshold; and
 lock the storage device based on the amount of time exceeding the threshold.

4. The contactless card of claim 3, the memory storing instructions which when executed by the processor circuit, cause the processor circuit to:
 receive another request to access the storage device;
 generate another cryptogram;
 transmit the another cryptogram to the computing device;
 receive, from the computing device, an indication specifying that the server did not decrypt the another cryptogram; and
 reject the another request to access the storage device based on the indication that the server did not decrypt the another cryptogram, wherein the controller maintains the storage device in the locked state.

5. The contactless card of claim 1, further comprising the wireless communications interface, the memory storing instructions which when executed by the processor circuit, cause the processor circuit to:
 transmit, to the computing device via the wireless communications interface, an indication specifying that the storage device is in the unlocked state.

6. The contactless card of claim 5, wherein the storage device comprises a universal serial bus (USB) storage device, wherein the controller is configured to:
 determine that a connector of the storage device has been inserted into a USB port; and
 expose the unlocked storage device to the USB port.

7. The contactless card of claim 1, wherein the requested access comprises one or more of: (i) reading data stored in the storage device, or (ii) writing data to the storage device, wherein the requested access is processed via one or more of: (i) inserting the storage device in a port, or (ii) the wireless communications interface, wherein the wireless communications interface comprises a near field communication (NFC) interface.

8. A method, comprising:
 receiving, by an applet executing on a processor of a contactless card via a wireless communications interface of the contactless card, a request to access a storage device of the contactless card, wherein the storage device is in a locked state;
 generating, by the applet, a cryptogram based on the request;
 transmitting, by the applet, the cryptogram to a computing device via the wireless communications interface;
 receiving, by the applet from the computing device, an indication specifying that a server decrypted the cryptogram;
 transmitting, by the applet to a controller of the storage device and based on the indication specifying that the server decrypted the cryptogram, an indication specifying to unlock the storage device; and
 transitioning, by the controller based on the indication received from the applet, the storage device from the locked state to an unlocked state.

9. The method of claim 8, further comprising:
 receiving, by the applet, another request specifying to lock the storage device;
 generating, by the applet, another cryptogram;
 transmitting, by the applet, the another cryptogram to the computing device;
 receiving, by the applet from the computing device, an indication specifying that the server decrypted the another cryptogram;
 transmitting, by the applet to the controller based on the indication specifying that the server decrypted the another cryptogram, an indication specifying to lock the storage device; and
 transitioning, by the controller based on the indication to lock the storage device, the storage device from the unlocked state to the locked state.

10. The method of claim 8, further comprising:
 determining, by the controller, an amount of time elapsed subsequent to unlocking the storage device exceeds a threshold; and
 transitioning, by the controller based on the determination that the amount of time exceeds the threshold, the storage device from the locked state to the unlocked state.

11. The method of claim 10, further comprising:
 receiving, by the applet, another request to access the storage device;
 generating, by the applet, another cryptogram;
 transmitting, by the applet, the another cryptogram to the computing device;
 receiving, by the applet from the computing device, an indication specifying that the server did not decrypt the another cryptogram; and
 rejecting, by the applet, the another request to access the storage device based on the indication that the server did not decrypt the another cryptogram, wherein the controller maintains the storage device in the locked state.

12. The method of claim 8, further comprising:
 transmitting, by the applet to the computing device via the wireless communications interface, an indication specifying that the storage device is in the unlocked state.

13. The method of claim 8, wherein the storage device comprises a universal serial bus (USB) storage device, the method further comprising:
 determining, by the controller, that a connector of the storage device has been inserted into a USB port; and
 exposing, by the controller, the unlocked storage device to the USB port.

14. The method of claim 8, wherein the requested access comprises one or more of: (i) reading data stored in the storage device, or (ii) writing data to the storage device, wherein the requested access is processed via one or more of: (i) inserting the storage device in a port, or (ii) the wireless communications interface, wherein the wireless communications interface comprises a near field communication (NFC) interface.

15. A non-transitory computer-readable storage medium having computer-readable program code embodied therewith, the computer-readable program code when executed by a processor circuit of a contactless card causes the processor circuit to:
 receive a request to access a storage device of the contactless card, wherein the storage device is in a locked state;
 generate a cryptogram based on the request;
 transmit the cryptogram to a computing device via a wireless communications interface;
 receive, from the computing device, an indication specifying that a server decrypted the cryptogram; and transmit, to the controller based on the indication specifying that the server decrypted the cryptogram, an indication specifying to unlock the storage device, wherein the controller transitions the storage device from the locked state to an unlocked state based on the indication.

16. The non-transitory computer-readable storage medium of claim 15, further comprising computer-readable program code executable by the processor circuit to cause the processor circuit to:
receive another request specifying to lock the storage device;
generate another cryptogram;
transmit the another cryptogram to the computing device;
receive, from the computing device, an indication specifying that the server decrypted the another cryptogram; and
transmit, to the controller based on the indication specifying that the server decrypted the another cryptogram, an indication specifying to lock the storage device, wherein the controller transitions the storage device from the unlocked state to the locked state based on the indication to lock the storage device.

17. The non-transitory computer-readable storage medium of claim 15, further comprising computer-readable program code executable by the processor circuit to:
determine an amount of time elapsed subsequent to unlocking the storage device exceeds a threshold; and
transmit, to the controller based on the amount of time exceeding the threshold, an indication to lock the storage device, wherein the controller transitions the storage device from the locked state to the unlocked state based on the indication to lock the storage device.

18. The non-transitory computer-readable storage medium of claim 17, further comprising computer-readable program code executable by the processor circuit to cause the processor circuit to:
receive another request to access the storage device;
generate another cryptogram;
transmit the another cryptogram to the computing device;
receive, from the computing device, an indication specifying that the server did not decrypt the another cryptogram; and
reject the another request to access the storage device based on the indication that the server did not decrypt the another cryptogram, wherein the controller maintains the storage device in the locked state.

19. The non-transitory computer-readable storage medium of claim 15, wherein the storage device comprises a universal serial bus (USB) storage device, further comprising computer-readable program code executable by the controller to cause the controller to:
determine that a connector of the storage device has been inserted into a USB port; and
expose the unlocked storage device to the USB port.

20. The non-transitory computer-readable storage medium of claim 15, wherein the requested access comprises one or more of: (i) reading data stored in the storage device, or (ii) writing data to the storage device, wherein the requested access is processed via one or more of: (i) inserting the storage device in a port, or (ii) the wireless communications interface, wherein the wireless communications interface comprises a near field communication (NFC) interface.

\* \* \* \* \*